US012596457B2

(12) United States Patent
Kang et al.

(10) Patent No.: US 12,596,457 B2
(45) Date of Patent: Apr. 7, 2026

(54) DISPLAY DEVICE AND INSPECTING METHOD THEREOF

(71) Applicant: Samsung Display Co., LTD., Yongin-si (KR)

(72) Inventors: Bong Il Kang, Yongin-si (KR); Min Hong Kim, Yongin-si (KR); Jung Mok Park, Yongin-si (KR); Ye Rin Oh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/765,098

(22) Filed: Jul. 5, 2024

(65) Prior Publication Data

US 2025/0117100 A1 Apr. 10, 2025

(30) Foreign Application Priority Data

Oct. 6, 2023 (KR) ........................ 10-2023-0133830

(51) Int. Cl.
*G06F 3/044* (2006.01)
(52) U.S. Cl.
CPC ................................... *G06F 3/044* (2013.01)
(58) Field of Classification Search
CPC ...................................................... G06F 3/044
See application file for complete search history.

(56) References Cited

U.S. PATENT DOCUMENTS

| | | | | |
|---|---|---|---|---|
| 10,146,369 | B2 * | 12/2018 | Chang | G06F 3/0416 |
| 11,086,455 | B2 * | 8/2021 | Singh | G06F 3/0416 |
| 2018/0011593 | A1 * | 1/2018 | Chang | G06F 8/71 |
| 2018/0150184 | A1 * | 5/2018 | Kim | G09G 3/3677 |
| 2020/0174597 | A1 * | 6/2020 | Singh | H02M 1/36 |

FOREIGN PATENT DOCUMENTS

| | | |
|---|---|---|
| KR | 10-1735715 B1 | 5/2017 |
| KR | 2022-0081402 A | 6/2022 |

* cited by examiner

*Primary Examiner* — Peter D Mcloone
(74) *Attorney, Agent, or Firm* — Womble Bond Dickinson (US) LLP

(57) ABSTRACT

In an inspecting method of a display device, the method includes: receiving an analog voltage from an external device; generating a first touch driving signal having a first potential based on the analog voltage; acquiring first raw data for each channel of touch electrodes by supplying the first touch driving signal to the touch electrodes; generating a second touch driving signal having a second potential higher than the first potential by using a charge pump; acquiring second raw data for each channel of the touch electrodes by supplying the second touch driving signal to the touch electrodes; calculating a ratio between the first raw data and the second raw data; and determining the charge pump is normal, based on the calculated ratio being within a designated range.

20 Claims, 13 Drawing Sheets

CE : CEa, CEb

DU : SUB, TFTL, EML, TFEL

FIG. 11

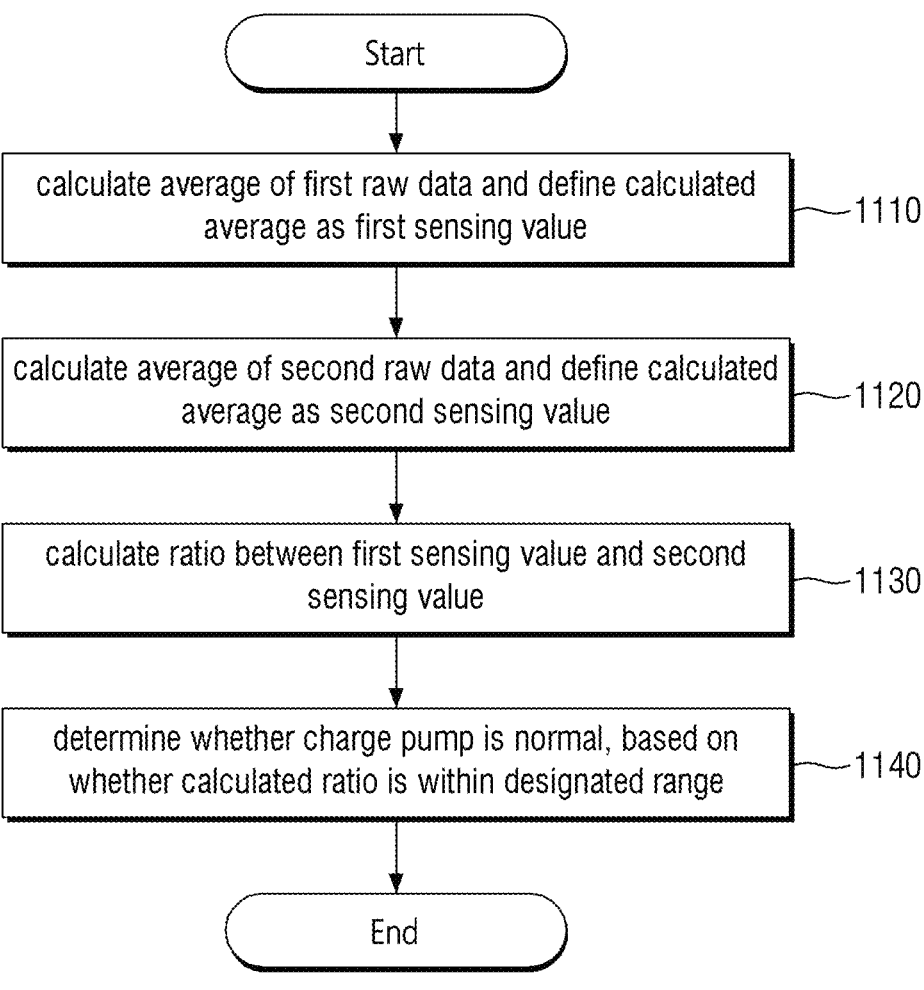

Start calculate average of first raw data and define calculated average as first sensing value —1110 calculate average of second raw data and define calculated average as second sensing value —1120 calculate ratio between first sensing value and second sensing value —1130 determine whether charge pump is normal, based on whether calculated ratio is within designated range —1140

End

DISPLAY DEVICE AND INSPECTING METHOD THEREOF

CROSS-REFERENCE TO RELATED APPLICATION

The present application claims priority to and the benefit of Korean Patent Application No. 10-2023-0133830, filed on Oct. 6, 2023, in the Korean Intellectual Property Office, the entire disclosure of which is incorporated herein by reference.

BACKGROUND

1. Field

Aspects of some embodiments of the present disclosure relate to a display device and an inspecting method thereof.

2. Description of the Related Art

With the advancement of the information age, consumer demand for display devices for displaying images has increased in various forms. The display device may be a flat panel display device such as a liquid crystal display device, a field emission display device and a light emitting display device. A light emitting display device may include an organic light emitting display device that includes an organic light emitting diode element as a light emitting element or a light emitting diode display device that includes an inorganic light emitting diode element such as a light emitting diode (LED) as a light emitting element.

A display device may include a touch panel as an input device. A touch driving circuit for driving the touch panel may generate a touch driving signal for driving touch electrodes of the touch panel. The touch driving signal may be generated using a high potential power source boosted from an analog voltage by a charge pump. When the charge pump embedded in the touch driving circuit operates abnormally, a potential of the high potential power source may be set abnormally, which may cause a defect in the touch panel.

The above information disclosed in this Background section is only for enhancement of understanding of the background and therefore the information discussed in this Background section does not necessarily constitute prior art.

SUMMARY

Aspects of some embodiments of the present disclosure include a display device capable of enabling inspection of whether a charge pump embedded in a touch driving circuit is normal and an inspecting method thereof.

According to some embodiments of the present disclosure, an inspecting method of a display device, the inspecting method may include receiving an analog voltage from an external device, generating a first touch driving signal having a first potential based on the analog voltage, acquiring first raw data for each channel of touch electrodes by supplying the first touch driving signal to the touch electrodes, generating a second touch driving signal having a second potential higher than the first potential by using a charge pump, acquiring second raw data for each channel of the touch electrodes by supplying the second touch driving signal to the touch electrodes, calculating a ratio between the first raw data and the second raw data, and determining whether the charge pump is normal, based on whether the calculated ratio is within a designated range.

According to some embodiments, the inspecting method may further include calculating an average of the first raw data and defining the calculated average as a first sensing value, calculating an average of the second raw data and defining the calculated average as a second sensing value, calculating a ratio between the first sensing value and the second sensing value, and determining whether the charge pump is normal, based on whether the calculated ratio is within a designated range.

According to some embodiments, the inspecting method may further include calculating an intermediate value of the first raw data and defining the calculated intermediate value as a first sensing value, calculating an intermediate value of the second raw data and defining the calculated intermediate value as a second sensing value, calculating a ratio between the first sensing value and the second sensing value, and determining whether the charge pump is normal, based on whether the calculated ratio is within a designated range.

According to some embodiments, the touch electrodes may include a plurality of first electrodes and a plurality of second electrodes intersecting the plurality of first electrodes.

According to some embodiments, the first and second touch driving signals may be signals applied to the plurality of first electrodes.

According to some embodiments, the first raw data and the second raw data may include analog data read out through the plurality of second electrodes.

According to some embodiments, the inspecting method may further include converting the first raw data from an analog signal into a digital signal, and converting the second raw data from an analog signal into a digital signal.

According to some embodiments, the touch electrodes include a plurality of self-touch electrodes arranged in the form of a matrix.

According to some embodiments, the charge pump is embedded in a touch driving circuit of the display device.

According to some embodiments, the first potential is about 3V, and the second potential is about 6V.

According to some embodiments of the present disclosure, a display device may include a touch unit including touch electrodes, and a touch driving circuit. The touch driving circuit may include a driving signal output unit configured to output a touch driving signal, a charge pump configured to boost an analog voltage having a first potential to a high potential power source having a second potential, a sensing circuit unit configured to sense raw data corresponding to a change in capacitance of the touch electrodes, an analog-to-digital converter converting the raw data acquired by the sensing circuit unit into digital data, and a touch controller. The touch controller is configured to control the driving signal output unit to output a first touch driving signal having the first potential, control the sensing circuit unit to acquire first raw data based on an output of the first touch driving signal, control the driving signal output unit to output a second touch driving signal having the second potential, control the sensing circuit unit to acquire second raw data based on an output of the second touch driving signal, calculate a ratio between the first raw data and the second raw data, and determine whether the charge pump is normal, based on whether the calculated ratio is in a designated range.

According to some embodiments, the touch controller may be further configured to calculate an average of the first raw data and defines the calculated average as a first sensing value, calculate an average of the second raw data and defines the calculated average as a second sensing value, calculate a ratio between the first sensing value and the second sensing value, and determine whether the charge pump is normal, based on whether the calculated ratio is within a designated range.

According to some embodiments, the touch controller may be further configured to calculate an intermediate value of the first raw data and defines the calculated intermediate value as a first sensing value, calculate an intermediate value of the second raw data and defines the calculated intermediate value as a second sensing value, calculate a ratio between the first sensing value and the second sensing value, and determine whether the charge pump is normal, based on whether the calculated ratio is within a designated range.

According to some embodiments, the touch electrodes may include a plurality of first electrodes and a plurality of second electrodes intersecting the plurality of first electrodes.

According to some embodiments, the first and second touch driving signals may be signals applied to the plurality of first electrodes.

According to some embodiments, the first raw data and the second raw data may include analog data read out through the plurality of second electrodes.

According to some embodiments, the touch controller may control the analog-to-digital converter to convert the first raw data from an analog signal into a digital signal, and controls the analog-to-digital converter to convert the second raw data from an analog signal into a digital signal.

According to some embodiments, the touch electrodes may include a plurality of self-touch electrodes arranged in the form of a matrix.

According to some embodiments, the analog voltage may be input from a battery.

According to some embodiments, the first potential may be about 3V, and the second potential may be about 6V.

In the display device and the inspecting method thereof according to some embodiments, it may be possible to inspect whether the charge pump embedded in the touch driving circuit is normal.

However, aspects of embodiments according to the present disclosure are not restricted to those set forth herein. The above and other aspects of embodiments according to the present disclosure will become more apparent to one of ordinary skill in the art to which embodiments according to the present disclosure pertains by referencing the detailed description of some embodiments of the present disclosure given below.

BRIEF DESCRIPTION OF DRAWINGS

The above and other aspects and features of embodiments according to the present disclosure will become more apparent by describing in more detail aspects of some embodiments thereof with reference to the attached drawings, in which:

FIG. 11 is a flow chart illustrating an inspecting method of a defect in a charge pump according to some embodiments by using an average;

DETAILED DESCRIPTION

Aspects of some embodiments of the present invention will now be described more fully hereinafter with reference to the accompanying drawings, in which aspects of some embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

Features of each of various embodiments of the present disclosure may be partially or entirely combined with each other and may technically variously interwork with each other, and respective embodiments may be implemented independently of each other or may be implemented together in association with each other.

Hereinafter, aspects of some embodiments will be described in more detail with reference to the accompanying drawings.

Figure 1:
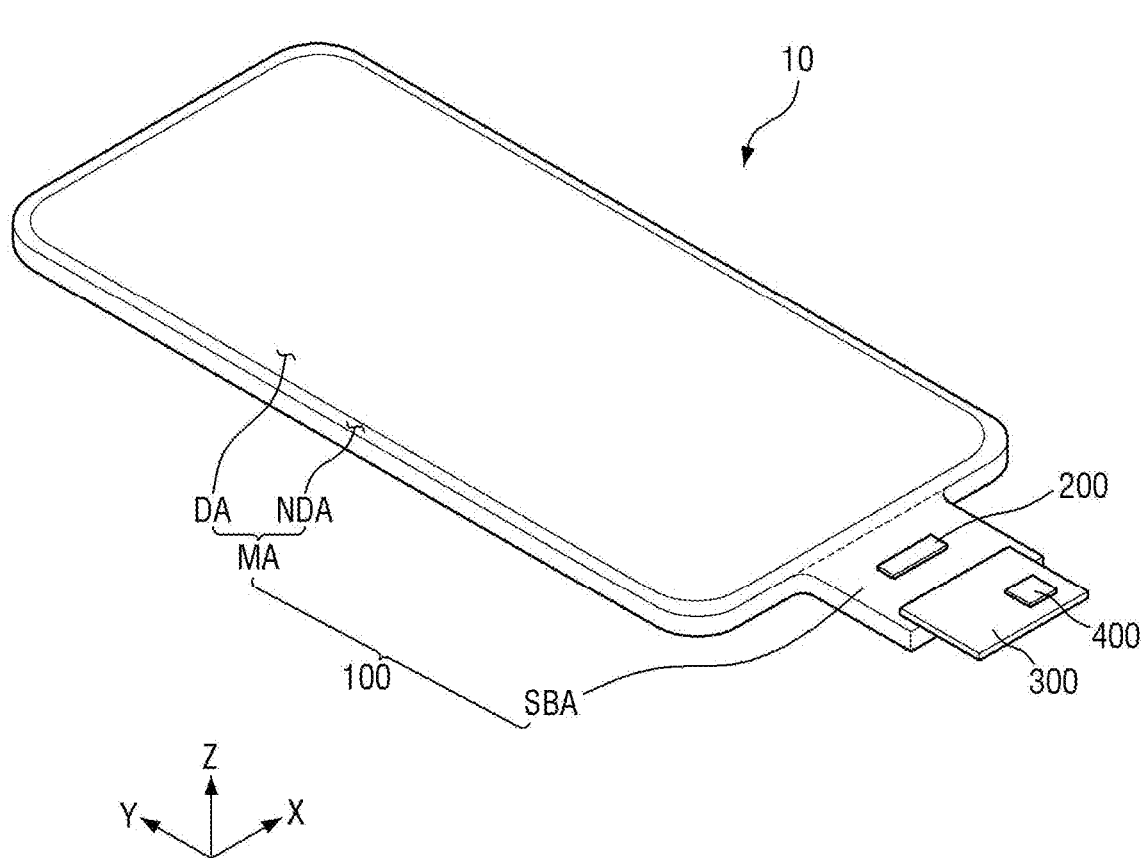
FIG. 1 is a schematic perspective view illustrating a display device according to some embodiments.
Figure 2:
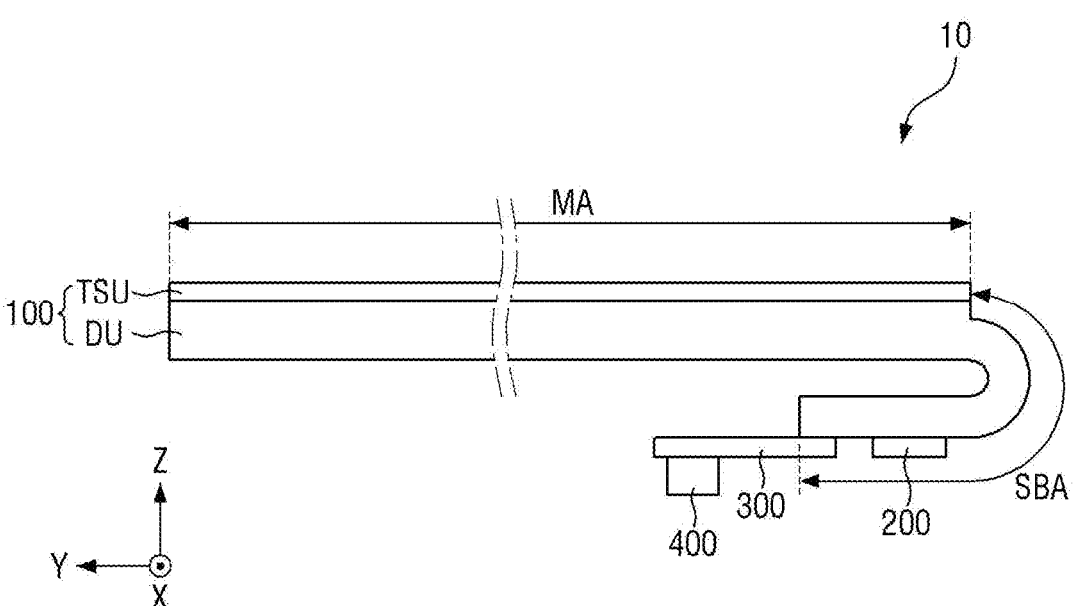
FIG. 2 is a schematic cross-sectional view illustrating a display device according to some embodiments.

FIG. 1 is a schematic perspective view illustrating a display device according to some embodiments. FIG. 2 is a schematic cross-sectional view illustrating a display device according to some embodiments.

In the drawings, a first direction X is a direction parallel with one side of a display device 10 when viewed on a plane (or in a plan view, or a direction perpendicular or normal with respect to a display surface of the display device, or from the Z direction), and refers to a short-side direction of the display device 10. A second direction Y is a direction parallel with the other side that is in contact with one side of the display device 10 when viewed on a plane, and refers to a long-side direction of the display device 10. A third direction Z refers to a thickness direction of the display device 10. However, it should be understood that the direction mentioned in the embodiments refers to a relative direction, and the embodiments according to the present disclosure are not limited thereto.

Various electronic devices for providing a display screen may be included in the display device 10. For example, the display device 10 may be applied to or incorporated into a portable electronic device such as a mobile phone, a smart phone, a tablet personal computer (PC), a mobile communication terminal, an electronic diary, an electronic book, a portable multimedia player (PMP), a navigator and an ultra mobile PC (UMPC). Also, the display device 10 may be applied to or incorporated into a television, a laptop computer, a monitor, a signboard or a display unit of Internet of things (IoT). Also, the display device 10 may be applied to a wearable device such as a smart watch, a watch phone, an eyeglasses-type display and a head mounted display (HMD).

Referring to FIG. 1, the display device 10 may have a planar shape similar to a rectangular shape. For example, the display device 10 may have a planar shape similar to a rectangular shape having a short side in the first direction X and a long side in the second direction Y. A corner at which the short side in the first direction X meets the long side in the second direction Y may have rounded shape corners to have a curvature (e.g., a set or predetermined curvature), or may have right-angled shape corners. The planar shape of the display device 10 may have another polygonal shape or a shape similar to a circular shape or an oval shape without being limited to the rectangular shape.

At least one of a front surface or a rear surface of the display device 10 may be a display surface. In this case, the "front surface" is a surface positioned at one side of one plane and refers to a surface positioned in the third direction Z in the drawing, and the "rear surface" is a surface positioned on the other side of one plane and refers to a surface positioned in a direction opposite to the third direction Z in the drawing. The display device 10 may be a double-sided display device 10 in which display is performed on both front and rear surfaces, but the following description will be based on the embodiments in which the display surface is positioned on the front surface of the display device 10.

The display device 10 includes a display panel 100 for providing a display screen, a display driving circuit 200, a circuit board 300 and a touch driving circuit 400. The touch driving circuit 400 is a component configured to sense a touch input of a user, and may be referred to as a "touch sensing device".

The display panel 100 may have a planar shape similar to a rectangular shape. For example, the display panel 100 may have a planar shape similar to a rectangular shape having a short side in the first direction X and a long side in the second direction Y. The corner at which the short side in the first direction X meets the long side in the second direction Y may have a rounded shape to have a curvature (e.g., a set or predetermined curvature), or may have a right-angled shape. The planar shape of the display panel 100 may have another polygonal shape or a shape similar to a circular shape or an oval shape without being limited to the rectangular shape. Also, the display panel 100 may be flexibly formed to be bent or curved.

The display panel 100 may include a main area MA and a sub-area SBA.

The main area MA may include a display area DA including pixels for displaying an image, and a non-display area NDA located near the display area DA. The display area DA may emit light from a plurality of light emission areas or a plurality of opening areas. For example, the display panel 100 may include a pixel circuit including switching elements, a pixel defining layer for defining a light emission area or an opening area, and a self-light emitting element.

The non-display area NDA may be an outer area of the display area DA. The non-display area NDA may be defined as an edge area of the main area MA of the display panel 100. The non-display area NDA may include a gate driver for supplying gate signals to gate lines of the display panel 100.

The sub-area SBA may be extended from one side of the main area MA. The sub-area SBA may be bent to overlap the main area MA in the third direction Z. The sub-area SBA may include a pad portion connected to the circuit board 300 and the display driving circuit 200.

Referring to FIG. 2, the display panel 100 includes a display unit DU and a touch unit TSU.

Figure 3:
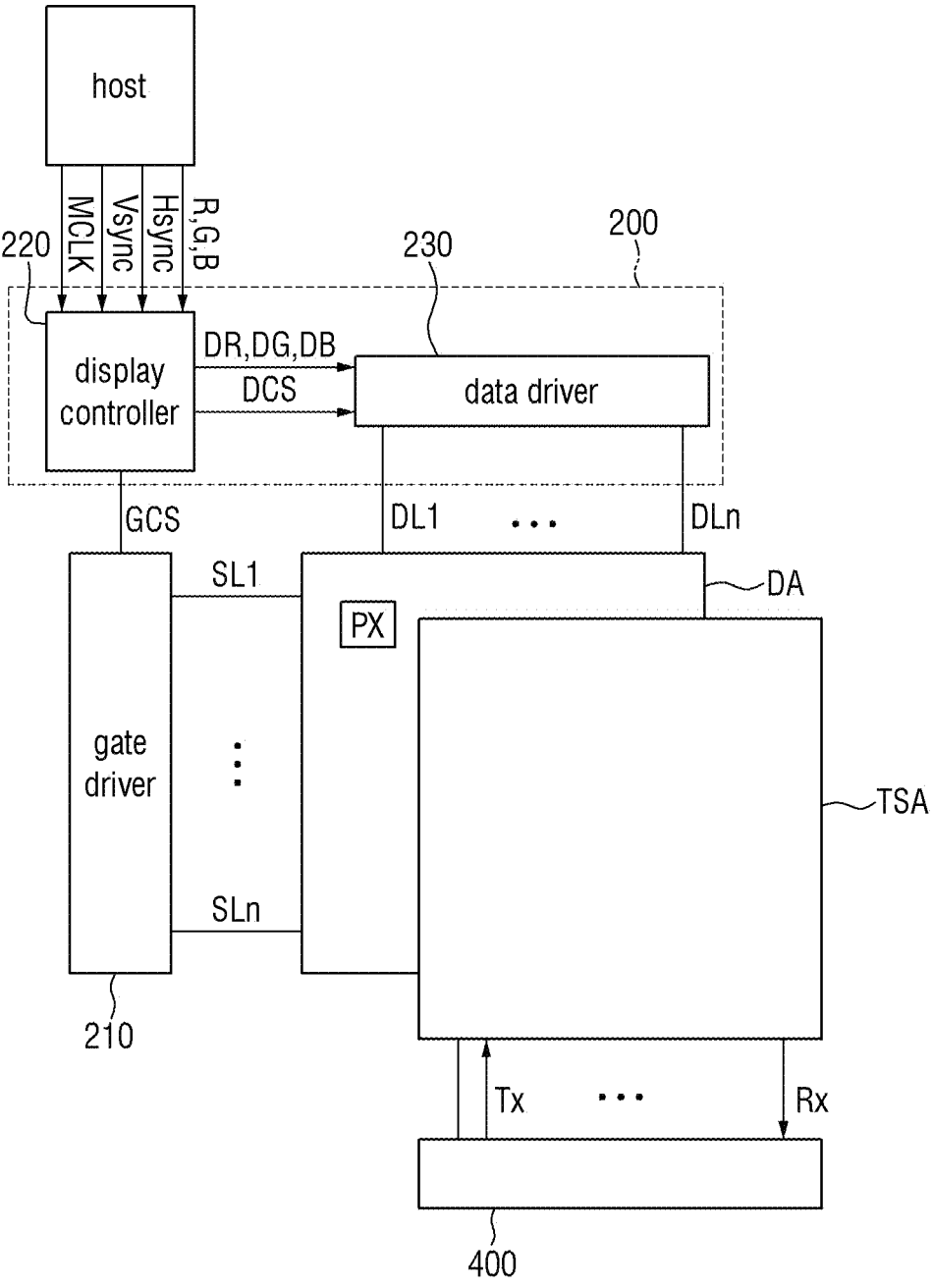
FIG. 3 is a conceptual view illustrating a display unit and a touch driving unit according to some embodiments.

The display unit DU may include a plurality of pixels (PX of FIG. 3). The pixel PX is a basic unit for displaying a screen or displaying images. One pixel PX may include a red subpixel, a green subpixel, and a blue subpixel, but embodiments according to the present disclosure are not limited thereto. The plurality of pixels PX may be alternately arranged on a plane (or in a plan view). For example, the pixel PX may be arranged in the form of a matrix, but embodiments according to the present disclosure are not limited thereto.

The touch unit TSU may be located on the display unit DU, but embodiments according to the present disclosure are not limited thereto. For example, the touch unit TSU may be formed in an in-cell touch manner like the display unit DU. The touch unit TSU may include a plurality of touch electrodes (SEN of FIG. 5) for sensing a user's touch in a capacitance manner, a plurality of touch driving lines (TL of FIG. 5) for connecting the plurality of touch electrodes SEN with the touch driving circuit 400, and a plurality of touch sensing lines (RL of FIG. 5). The touch unit TSU is a layer for sensing a touch input, and may perform a function of a touch member. The touch unit TSU may determine whether a touch is input and calculate a corresponding position as touch input coordinates. A detailed description of the display unit DU and the touch unit TSU will be described in more detail later with reference to FIGS. 4 to 7.

The display unit DU and the touch unit TSU may be arranged to overlap each other. For example, the display area DA may be an area for displaying a screen, and may be an area for sensing a touch input.

The sub-area SBA of the display panel 100 may be extended from one side of the main area MA. The sub-area SBA may include a flexible material capable of being subjected to bending, folding, rolling and the like. For example, a portion of the sub-area SBA may be bent at one side of the main area MA, and another portion of the sub-area SBA extended from the bent portion of the sub-area SBA may overlap the main area MA in the third direction (Z-axis direction). The sub-area SBA may include a display driving circuit 200, and a pad portion connected to the circuit board 300.

Referring to FIG. 1, the display driving circuit 200 may be located in the sub-area SBA of the display panel 100. Also, the display driving circuit 200 may be formed of an integrated circuit (IC), and may be packaged on the display panel 100 in a chip on plastic (COP) manner or a chip on glass (COG) manner.

The display driving circuit 200 may output data signals and voltages for driving the display panel 100. The display driving circuit 200 may supply the data voltages to data lines of the display panel 100. The display driving circuit 200 may supply a power voltage to a power line of the display panel 100, and may supply gate control signals to the gate driver.

The circuit board 300 may be located in the sub-area SBA of the display panel 100. Lead lines of the circuit board 300 may be electrically connected to the pad portion of the display panel 100. The circuit board 300 may be a flexible printed circuit board, a printed circuit board, or a flexible film such as a chip on film.

The circuit board 300 may include a plurality of conductive lines for transferring a signal from a main circuit board to the display driving circuit 200 or electrically connecting the touch driving circuit 400 with a plurality of first electrodes TE and a plurality of second electrodes RE of the touch unit TSU.

The first electrode TE may be herein referred to as a term such as a "touch driving electrode". The second electrode RE may be herein referred to as a term such as a "touch sensing electrode".

The touch driving circuit 400 may be located in the sub-area SBA of the display panel 100. Alternatively, the touch driving circuit 400 may be packaged on the circuit board 300.

The touch driving circuit 400 may calculate whether a touch is input and touch coordinates, based on that the amount of a change in capacitance between the plurality of touch electrodes is sensed. The touch driving circuit 400 may be formed of an integrated circuit (IC), and may be packaged on the display panel 100 in a chip on plastic (COP) manner or a chip on glass (COG) manner.

Figure 4:
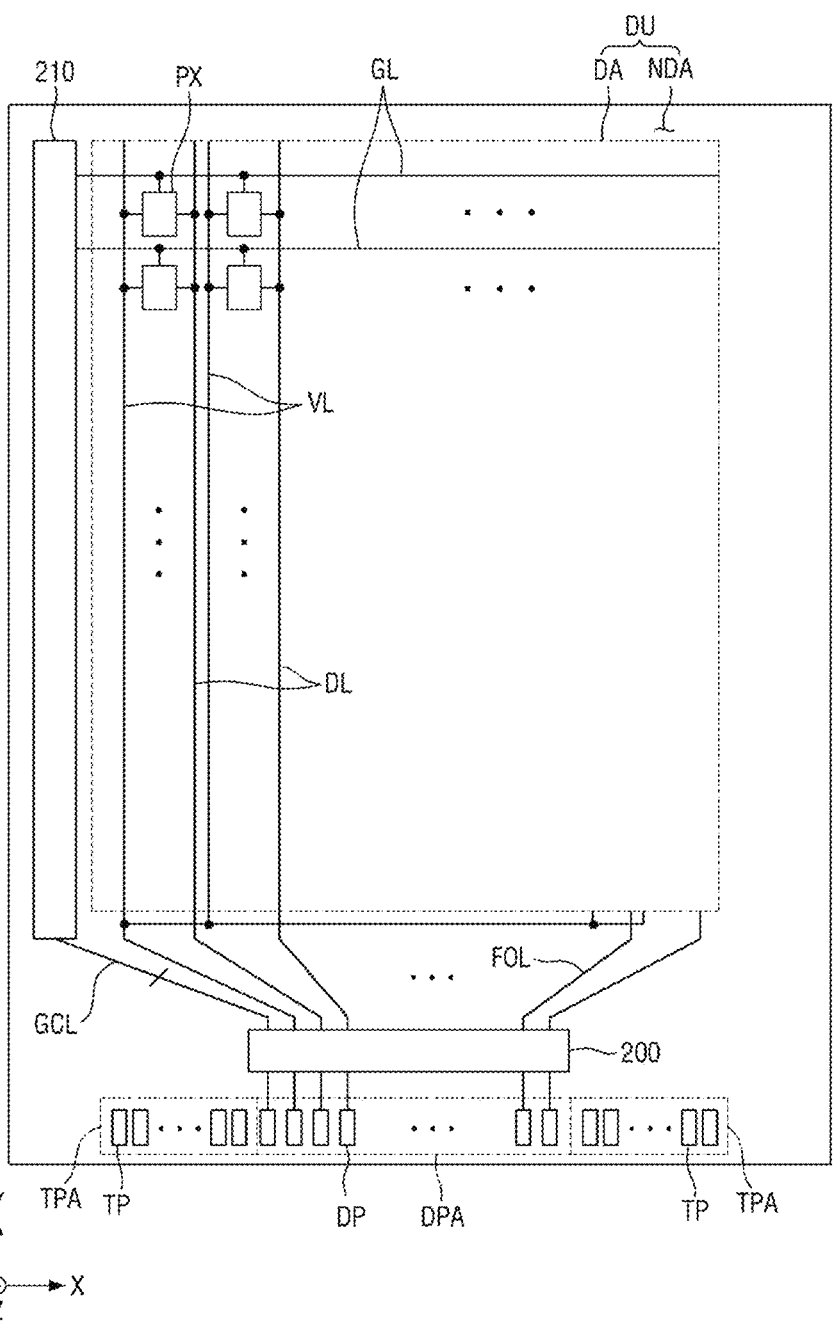
FIG. 4 is a schematic plan view illustrating a display unit of a display device according to some embodiments.

FIG. 3 is a conceptual view illustrating a display unit and a touch driving unit according to some embodiments. FIG. 4 is a schematic plan view illustrating a display unit of a display device according to some embodiments.

Referring to FIGS. 3 and 4, the display device 10 includes a display panel 100 including a plurality of pixels PX, a display driving circuit 200 and a touch driving circuit 400. The display driving circuit 200 and the touch driving circuit 400 may operate based on a control signal or a command signal from a host. For example, the host may be a processor. According to some embodiments, the touch driving circuit 400 may be controlled by the display driving circuit 200.

The display driving circuit 200 may include a data driver 230 and a display controller 220.

The display controller 220 may receive input data R, G and B and a timing control signal from the outside (e.g., host). The timing control signal may include a vertical synchronization signal Vsync indicating one frame period, a horizontal synchronization signal Hsync indicating one horizontal period and a main clock MCLK repeated at a cycle (e.g., a set or predetermined cycle). The input data R, G and B may be RGB data including red image data, green image data and blue image data. The display controller 220 may generate output data signals DR, DG and DB and an internal control signal by using the received input data R, G and B and the timing control signal. The internal control signal includes a data control signal DCS and a gate control signal GCS.

The display controller 220 may control the operation of the data driver 230 by providing the data control signal DCS to the data driver 230. The display controller 220 may control the operation of the gate driver 210 by providing the gate control signal GCS to the gate driver 210.

The data driver 230 may receive the output data signals DR, DG and DB and the data control signal DCS from the display controller 220. The data driver 230 may generate a data signal by using the received output data signals DR, DG and DB and the data control signal DCS. The data driver 230 may provide the generated data signal to the display panel 100. The data driver 230 may provide the data signal to the plurality of pixels PX through a plurality of data lines (DL of FIG. 4) formed in the display panel 100.

The gate driver 210 may receive the gate control signal GCS from the display controller 220. The gate driver 210 may generate a gate signal by using the received gate control signal GCS. The gate driver 210 may provide the generated gate signal to the display panel 100. The gate driver 210 may provide the gate signal to the plurality of pixels PX through a plurality of gate lines (GL of FIG. 4) formed in the display panel 100. A detailed description of the plurality of data lines (DL of FIG. 4) and the plurality of gate lines (GL of FIG. 4) will be described later with reference to FIG. 4.

The display driving circuit 200 is shown in FIG. 3 as not including the gate driver 210, but embodiments according to the present disclosure are not limited thereto. For example, the gate driver 210 may be included in the display driving circuit 200 for controlling the operation of the display panel 100. The gate driver 210, the data driver 230 and the display controller 220 may be formed of an integrated circuit (IC). The gate driver 210 may be formed together with the display panel 100 in a TFT process of the display panel 100. The display controller 220 and the data driver 230 may be merged into each other to configure timing controller embedded driver integrated circuits (TED).

The display panel 100 may include a plurality of pixels PX connected to a plurality of data lines (DL of FIG. 4) and a plurality of gate lines (GL of FIG. 4).

A frame frequency for driving the display panel 100 by the display driving circuit 200 may be varied. For example, the frame frequency may be varied within the range of 1 Hz to 240 Hz in accordance with the host or a user's selection. The display driving circuit 200 may be driven at 60 Hz during one period, and may change the frame frequency to 120 Hz during another period in accordance with the user's needs.

Figure 5:
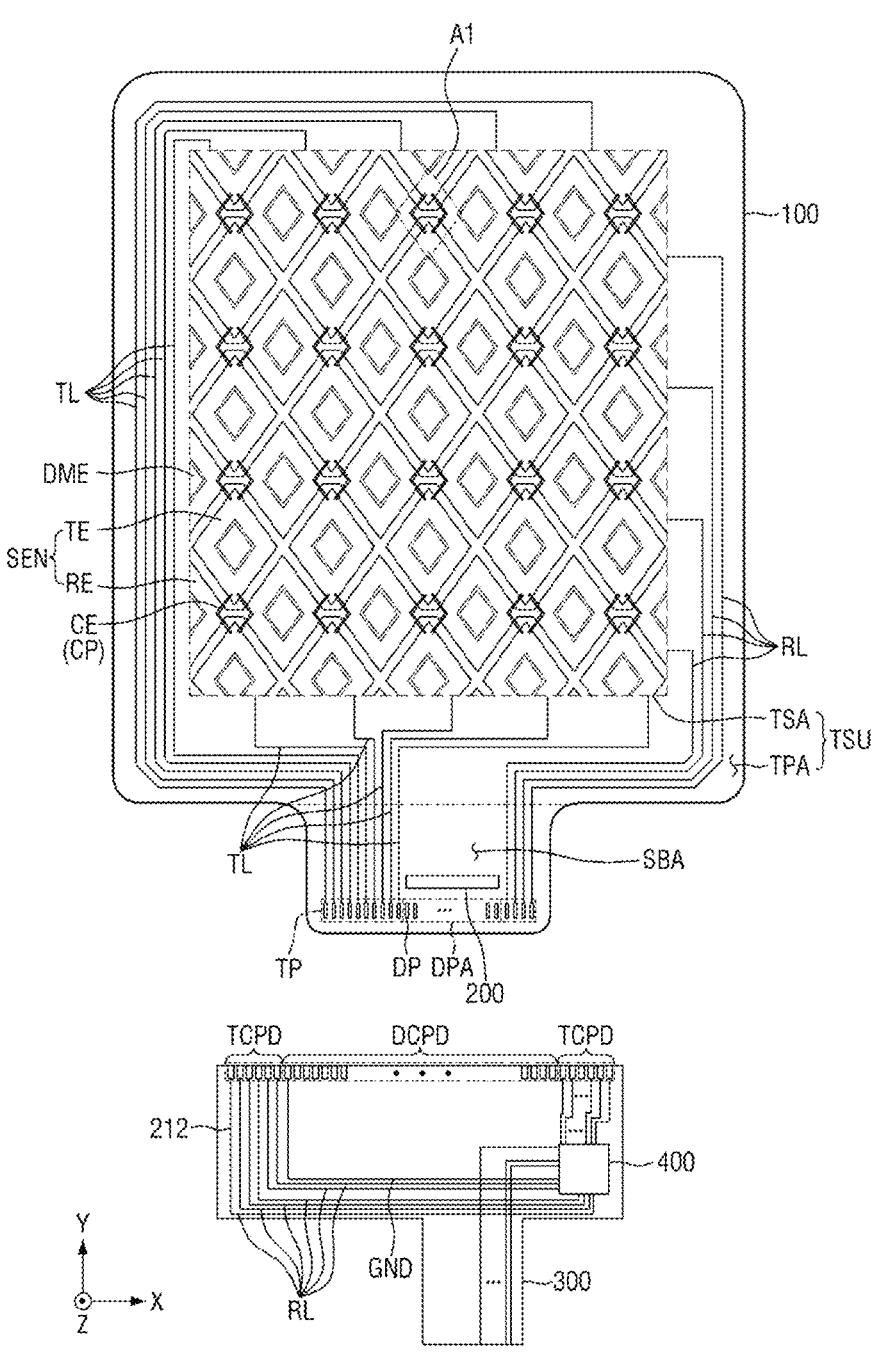
FIG. 5 is a plan view illustrating a touch unit of a display device according to some embodiments.

The touch sensing area TSA may include a plurality of first electrodes (TE of FIG. 5), a plurality of second electrodes (RE of FIG. 5), a plurality of touch driving lines (TL of FIG. 5) and a plurality of touch sensing lines (RL of FIG. 5). The touch sensing area TSA may sense a touch input by receiving an electrical signal from the touch driving circuit 400 located on the circuit board 300 through the plurality of touch driving lines TL or by sending the electrical signal sensed from the plurality of second electrodes RE to the touch driving circuit 400 through the plurality of touch sensing lines RL. In detail, the touch driving circuit 400 may sense a touch input by converting an analog type electrical signal sensed in the touch sensing area TSA into a digital signal. A detailed description of the touch driving circuit 400 will be described later with reference to FIG. 5.

Referring to FIG. 4, the display unit DU may include a display area DA and a non-display area NDA. The display unit DU may include a plurality of subpixels PX, and a plurality of gate lines GL and a plurality of data lines DL, which are connected to the plurality of subpixels PX.

The plurality of gate lines GL may supply the gate signal received from the gate driver 210 to the plurality of subpixels PX. The plurality of gate lines GL may be extended in the first direction X, and may be spaced apart from each other in the second direction Y crossing the first direction X.

The plurality of data lines DL may supply the output data signals DR, DG and DB and the data signals, which are received from the display driving circuit 200, to the plurality of subpixels PX. The plurality of data lines DL may be extended in the second direction Y, and may be spaced apart from each other in the first direction X.

The non-display area NDA may surround the display area DA. For example, the non-display area NDA may include a gate driver 210 for applying gate signals to the plurality of gate lines GL, fan-out lines FOL for connecting the plurality of data lines DL with the display driving circuit 200, and a display pad DP connected to the circuit board 300.

The display driving circuit 200 may supply the gate control signal GCS to the gate driver 210 through the gate control line GCL. The gate driver 210 may generate a plurality of gate signals based on the gate control signal GCS and sequentially supply the plurality of gate signals to the plurality of gate lines GL in accordance with a set order.

The display driving circuit 200 may supply a first power voltage to first power lines VL through the data driver 230 and supply a second power voltage to a second power line. Each of the plurality of subpixels PX may be supplied with the first power voltage through the first power line VL, and may be supplied with the second power voltage through the second power line. The first power voltage may be a high level voltage (e.g., a set or predetermined high level voltage), and the second power voltage may be a voltage lower than the first power voltage.

A display pad area DPA and a touch peripheral area TPA may be located at an edge of the display panel 100. The display pad area DPA may include a plurality of display pad portions DP. The plurality of display pads DP may be connected to a main processor through the circuit board 300. The plurality of display pads DP may be connected to the circuit board 300 to receive digital video data, and may supply the digital video data to the display driving circuit 200.

FIG. 5 is a plan view illustrating a touch unit of a display device according to some embodiments.

Referring to FIG. 5, the touch unit TSU may include a touch sensing area TSA for sensing a user's touch and a touch peripheral area TPA located near the touch sensing area TSA. The touch sensing area TSA may overlap the display area DA of the display panel 100, and the touch peripheral area TPA may overlap the non-display area NDA of the display panel 100.

The touch unit TSU may include a plurality of first electrodes TE, a plurality of second electrodes RE, a plurality of touch driving lines TL and a plurality of touch sensing lines RL.

The circuit board 300 may include first circuit pad portions DCPD connected to the display pads DP of the display panel 100, second circuit pad portions TCPD connected to touch pads TP of the display panel 100, and touch circuit lines 212 for connecting the second circuit pad portions TCPD with the touch driving circuit 400.

The touch sensing area TSA is a touch electrode SEN, and includes a plurality of first electrodes TE and a plurality of second electrodes RE. The plurality of first electrodes TE and the plurality of second electrodes RE may be electrically connected to the touch driving circuit 400 of the circuit board 300. The touch sensing area TSA may receive an electrical signal from the touch driving circuit 400 located on the circuit board 300 through the plurality of touch driving lines TL and the plurality of touch sensing lines RL or send the electrical signal sensed from the plurality of first and second electrodes TE and RE to the touch driving circuit 400 through the plurality of touch driving lines TL and the plurality of touch sensing lines RL.

The plurality of first electrodes TE may be arranged in the first direction X and the second direction Y. The plurality of first electrodes TE may be spaced apart from each other in the first direction X and the second direction Y. The first electrodes TE adjacent to each other in the second direction Y may be electrically connected to each other through a bridge electrode CE.

The plurality of first electrodes TE may be connected to the touch pad TP through the touch driving line TL. A portion of the plurality of touch driving lines TL may be extended to the touch pad TP after passing through a lower side of the touch peripheral area TPA. Another portion of the plurality of touch driving lines TL may be extended to the touch pad TP via an upper side, a left side and the lower side of the touch peripheral area TPA. The touch pad TP may be connected to the touch driving circuit 400 through the circuit board 300.

The display pads DP and the touch pad TP may be located at an edge of the sub-area SBA of the display panel 100. The display pads DP and the touch pad TP may be electrically connected to the circuit board 300 by using a low-resistance and high-reliability material such as an anisotropic conductive film.

The plurality of second electrodes RE may be extended in the first direction X, and may be spaced apart from each other in the second direction Y. The plurality of second electrodes RE may be arranged in the first direction X and the second direction Y, and the plurality of second electrodes RE adjacent to each other in the first direction X may be electrically connected to each other through a connector.

The plurality of second electrodes RE may be connected to the touch pad TP through the plurality of touch sensing lines RL. For example, the plurality of second electrodes RE located at a right side of the touch sensing area TSA may be connected to the touch pad TP through the plurality of touch sensing lines RL. The plurality of touch sensing lines RL may be extended to the touch pad TP via a right side and a lower side of the touch peripheral area TPA. The touch pad TP may be connected to the touch driving circuit 400 through the circuit board 300.

The plurality of first electrodes TE and the plurality of second electrodes RE may include a planar pattern made of a transparent conductive layer, or a mesh type pattern to which an opaque metal is applied along an area where a light emitting element is not located, so as not to disturb the progress of light emitted from the display area DA.

The touch driving signal may be applied from the touch driving circuit 400 to each of the plurality of first electrodes TE through any one of the plurality of touch driving lines TL. When the touch driving signal is applied to the plurality of first electrodes TE, mutual capacitance may be formed between the first electrode TE and the second electrode RE, which are adjacent to each other. When a touch input is generated from the outside (e.g., from an external source), a mutual capacitance value between the first electrode TE and the second electrode RE, which are adjacent to each other, may be changed. The change in mutual capacitance value between the first electrode TE and the second electrode RE, which are adjacent to each other, may be transferred to the touch driving circuit 400 through the plurality of touch sensing lines RL. Therefore, the touch driving circuit 400 may determine whether a touch is input and calculate the corresponding position as touch input coordinates. The touch sensing may be performed in a mutual capacitance manner, but embodiments according to the present disclosure are not limited thereto.

A reference numeral GND, which is not described in FIG. 5, may be a ground line formed in the circuit board 300.

A reference numeral DME, which is not described in FIG. 5, may be a dummy electrode. The plurality of first electrodes TE, the plurality of second electrodes RE and the plurality of dummy electrodes DME may be located on the same layer, and may be spaced apart from one another.

Figure 6:
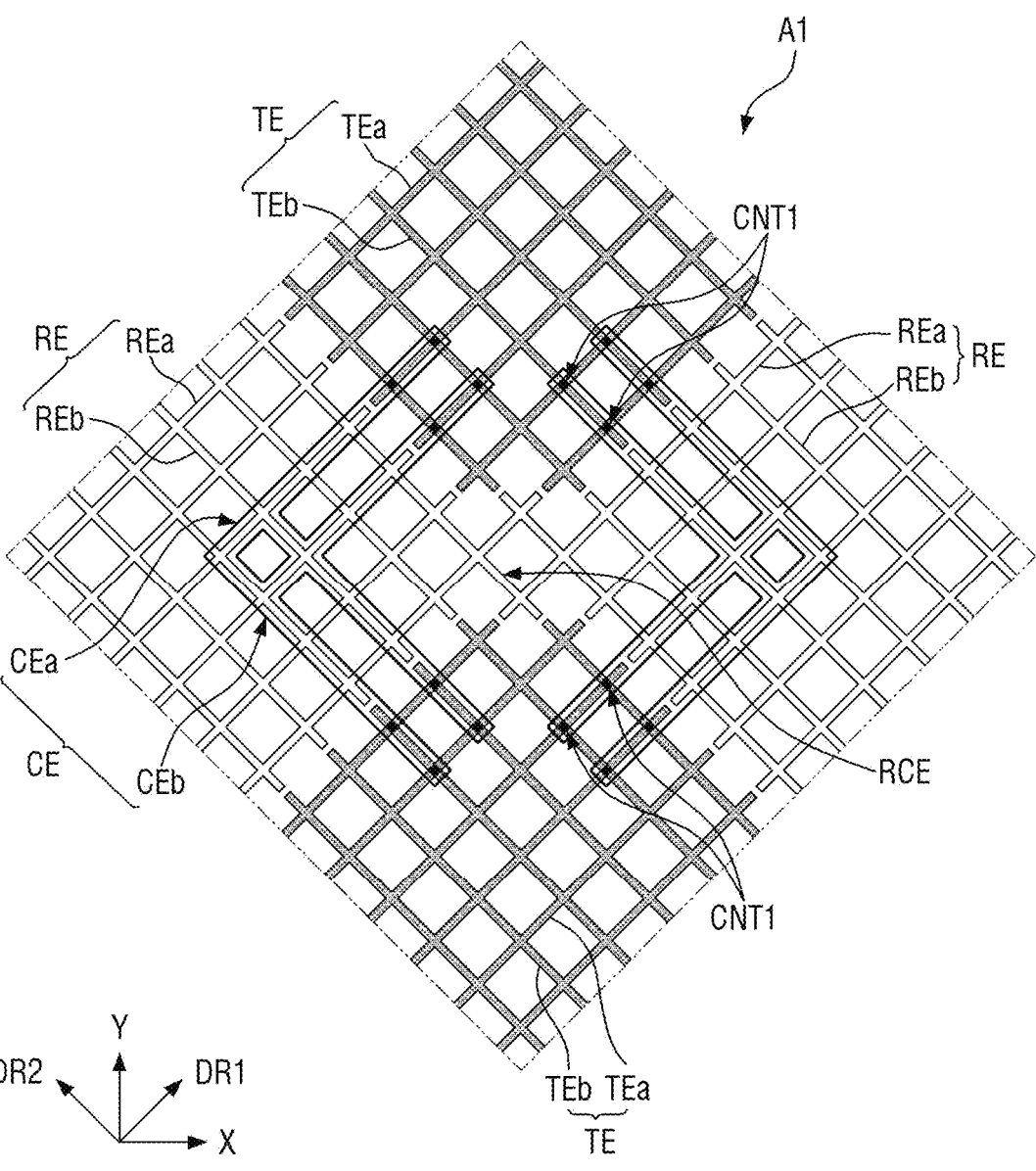
FIG. 6 is an enlarged view illustrating an area A1 of FIG. 5 according to some embodiments.
Figure 7:
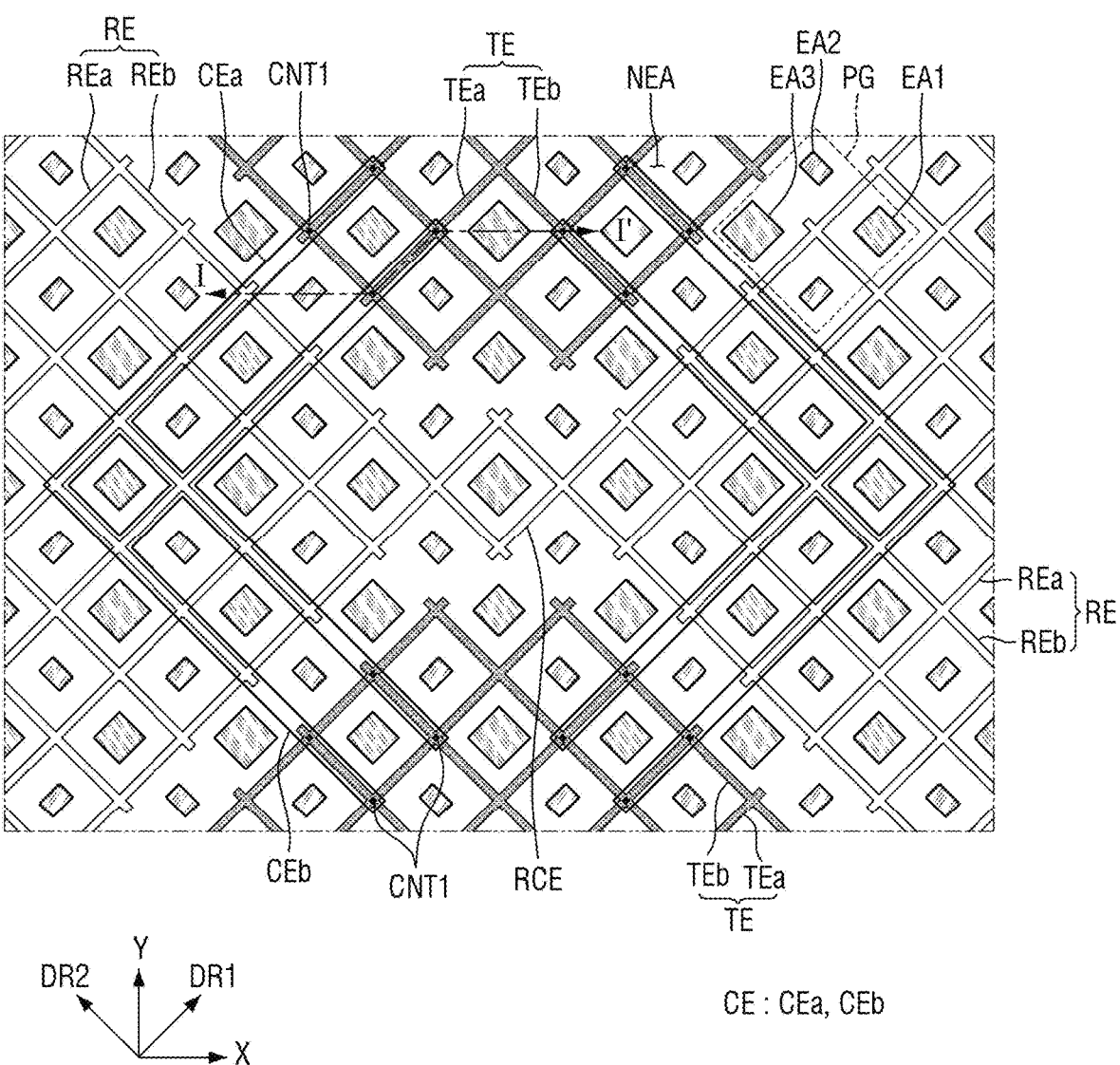
FIG. 7 is an enlarged view illustrating a portion of a display device according to some embodiments.

FIG. 6 is an enlarged view of the area A1 of FIG. 5. FIG. 7 is an enlarged view illustrating a portion of a display device according to some embodiments.

Referring to FIGS. 6 and 7, the plurality of first electrodes TE may be arranged in the first direction X and the second direction Y. The plurality of first electrodes TE may be spaced apart from each other in the first direction X and the second direction Y. The first electrodes TE adjacent to each other in the second direction Y may be electrically connected to each other through the bridge electrode CE.

The plurality of second electrodes RE may be extended in the first direction X, and may be spaced apart from each other in the second direction Y. The plurality of second electrodes RE may be arranged in the first direction X and the second direction Y, and the second electrodes RE adjacent to each other in the first direction X may be electrically connected to each other through a connection portion RCE. For example, the connection portion RCE of the second electrodes RE may be arranged to cross between the first electrodes TE adjacent to each other.

A plurality of bridge electrodes CE may be located on a different layer from the first electrode TE and the second electrode RE. The bridge electrode CE may include a first portion CEa and a second portion CEb. For example, the second portion CEb of the bridge electrode CE may be connected to the first electrode TE located at one side through a first contact hole CNT1 and thus extended in the other direction DR2. The first portion CEa of the bridge electrode CE may be bent from the second portion CEb in an area overlapped with the second electrode RE and thus extended in one direction DR1, and may be connected to the first electrode TE located at the other side through the first contact hole CNT1. The one direction DR1 may be a direction between the first direction X and the second direction Y, and the other direction DR2 may be a direction crossing the one direction DR1. For example, each of the plurality of bridge electrodes CE may connect the first electrodes TE adjacent to each other in the second direction Y.

According to some embodiments, the plurality of first electrodes TE, the plurality of second electrodes RE and the plurality of dummy electrodes (DME of FIG. 5) may be formed in a planar mesh structure or a mesh structure. The plurality of first electrodes TE, the plurality of second electrodes RE and the plurality of dummy electrodes (DME of FIG. 5) may not overlap first to third light emission areas EA1, EA2 and EA3 of the pixel PX. The plurality of bridge electrodes CE may not overlap the first to third light emission areas EA1, EA2 and EA3. Therefore, the display device 10 may prevent luminance of light emitted from the first to third light emission areas EA1, EA2 and EA3 from being reduced by the touch unit TSU.

Each of the plurality of first electrodes TE may include a first portion TEa extended in one direction DR1 and a second portion TEb extended in the other direction DR2. Each of the plurality of second electrodes RE may include a first portion REa extended in one direction DR1 and a second portion REb extended in the other direction DR2.

According to some embodiments, the plurality of first electrodes TE, the plurality of second electrodes RE and the plurality of dummy electrodes (DME of FIG. 5) may be formed in an entire surface structure not a planar mesh structure. In this case, the plurality of first electrodes TE, the plurality of second electrodes RE and the plurality of dummy electrodes (DME of FIG. 5) may include a transparent conductive material having high light transmittance, such as indium tin oxide (ITO) and indium zinc oxide (IZO).

The plurality of pixels PX may include first to third subpixels, and each of the first to third subpixels may include first to third light emission areas EA1, EA2 and EA3. For example, the first light emission area EA1 may emit light of a first color or red light, the second light emission area EA2 may emit light of a second color or green light, and the third light emission area EA3 may emit light of a third color or blue light, but embodiments according to the present disclosure are not limited thereto.

One pixel PX may include one first light emission area EA1, two second light emission areas EA2 and one third light emission area EA3 to represent a white gray scale. Therefore, the white gray scale may be expressed by combination of light emitted from one first light emission area EA1, light emitted from two second light emission areas EA2 and light emitted from one third light emission area EA3.

Figure 8:
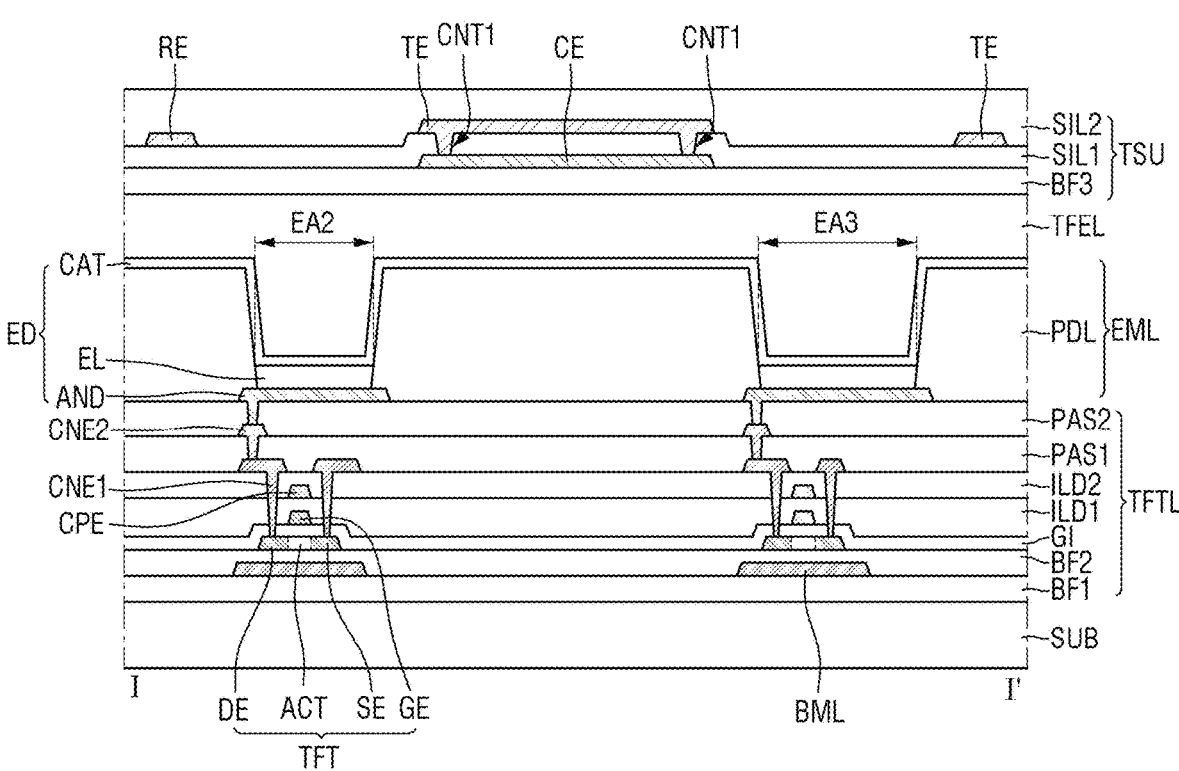
FIG. 8 is a cross-sectional view illustrating a display device according to some embodiments, which is taken along the line I-I' of FIG. 7.

FIG. 8 is a cross-sectional view taken along the line I-I' of FIG. 7.

Referring to FIG. 8, the display panel 100 may include a display unit DU and a touch unit TSU. The display unit DU may include a substrate SUB, a thin film transistor layer TFTL, a light emitting element layer EML and an encapsulation layer TFEL.

The substrate SUB may support the display panel 100. The substrate SUB may be a base substrate or a base member, and may be made of an insulating material such as a polymer resin. For example, the substrate SUB may be a flexible substrate capable of being subjected to bending, folding, rolling and the like. For another example, the substrate SUB may include a flexible material and a rigid material.

The thin film transistor layer TFTL may include first and second buffer layers BF1 and BF2, a thin film transistor TFT, a gate insulating layer GI, a first interlayer insulating layer ILD1, a capacitor electrode CPE, a second interlayer insulating layer ILD2, a first connection electrode CNE1, a first passivation layer PAS1, a second connection electrode CNE2 and a second passivation layer PAS2.

The first buffer layer BF1 may be located on the substrate SUB. The first buffer layer BF1 may include an inorganic layer capable of preventing permeation of the air or moisture. For example, the first buffer layer BF1 may include a plurality of inorganic layers that are alternately stacked.

A light blocking layer BML may be located on the first buffer layer BF1. For example, the light blocking layer BML may be formed of a single layer or multi-layer made of one of molybdenum (Mo), aluminum (Al), chromium (Cr), gold (Au), titanium (Ti), nickel (Ni), neodymium (Nd) and copper (Cu) or their alloy. For another example, the light blocking layer BML may be an organic layer including a black pigment.

The second buffer layer BF2 may cover the first buffer layer BF1 and the light blocking layer BML. The second buffer layer BF2 may include an inorganic layer capable of preventing permeation of the air or moisture. For example, the second buffer layer BF2 may include a plurality of inorganic layers that are alternately stacked.

The thin film transistor TFT may be located on the second buffer layer BF2, and may constitute a pixel circuit of each of the plurality of pixels. For example, the thin film transistor TFT may be a driving transistor or a switching transistor of the pixel circuit. The thin film transistor TFT may include a semiconductor area ACT, a gate electrode GE, a source electrode SE and a drain electrode DE.

The semiconductor area ACT, the source electrode SE and the drain electrode DE may be located on the second buffer layer BF2. The semiconductor area ACT may overlap the gate electrode GE in the thickness direction, and may be insulated from the gate electrode GE by the gate insulating layer GI. The source electrode SE and the drain electrode DE may be formed by conductorizing a material of the semiconductor area ACT.

The gate electrode GE may be located on the gate insulating layer GI. The gate electrode GE may overlap the semiconductor area ACT with the gate insulating layer GI interposed therebetween.

The gate insulating layer GI may be located on the semiconductor area ACT, the source electrode SE and the drain electrode DE. For example, the gate insulating layer GI may cover the semiconductor area ACT, the source electrode SE, the drain electrode DE and the second buffer layer BF2, and may insulate the semiconductor area ACT from the gate electrode GE. The gate insulating layer GI may include a contact hole through which the first connection electrode CNE1 passes.

The first interlayer insulating layer ILD1 may cover the gate electrode GE and the gate insulating layer GI. The first interlayer insulating layer ILD1 may include a contact hole through which the first connection electrode CNE1 passes. The contact hole of the first interlayer insulating layer ILD1 may be connected to the contact hole of the gate insulating layer GI and a contact hole of the second interlayer insulating layer ILD2.

The capacitor electrode CPE may be located on the first interlayer insulating layer ILD1. The capacitor electrode CPE may overlap the gate electrode GE in the third direction (Z-axis direction).

The second interlayer insulating layer ILD2 may cover the capacitor electrode CPE and the first interlayer insulating layer ILD1. The second interlayer insulating layer ILD2 may include a contact hole through which the first connection electrode CNE1 passes. The contact hole of the second interlayer insulating layer ILD2 may be connected to the contact hole of the first interlayer insulating layer ILD1 and the contact hole of the gate insulating layer GI.

The first connection electrode CNE1 may be located on the second interlayer insulating layer ILD2. The first connection electrode CNE1 may connect the drain electrode DE of the thin film transistor TFT with the second connection electrode CNE2. The first connection electrode CNE1 may be inserted into the contact holes formed in the second interlayer insulating layer ILD2, the first interlayer insulating layer ILD1 and the gate insulating layer GI to contact the drain electrode DE of the thin film transistor TFT.

The first passivation layer PAS1 may cover the first connection electrode CNE1 and the second interlayer insulating layer ILD2. The first passivation layer PAS1 may protect the thin film transistor TFT. The first passivation layer PAS1 may include a contact hole through which the second connection electrode CNE2 passes.

The second connection electrode CNE2 may be located on the first passivation layer PAS1. The second connection electrode CNE2 may connect the first connection electrode CNE1 with a first electrode AND of the light emitting element ED. The second connection electrode CNE2 may be inserted into the contact hole provided in the first passivation layer PAS1 to contact the first connection electrode CNE1.

The second passivation layer PAS2 may cover the second connection electrode CNE2 and the first passivation layer PAS1. The second passivation layer PAS2 may include a contact hole through which the first electrode of the light emitting element ED passes.

The light emitting element layer EML may be located on the thin film transistor layer TFTL. The light emitting element layer EML may include a light emitting element ED and a pixel defining layer PDL. The light emitting element ED may include a first electrode AND, a light emitting layer EL and a second electrode CAT.

The first electrode AND may be located on the second passivation layer PAS2. The first electrode AND may be arranged to overlap one of the first to third light emission areas EA1, EA2 and EA3 defined by the pixel defining layer PDL. The first electrode AND may be connected to the drain electrode DE of the thin film transistor TFT through the first and second connection electrodes CNE1 and CNE2.

The light emitting layer EL may be located on the first electrode AND. For example, the light emitting layer EL may be an organic light emitting layer made of an organic material, but embodiments according to the present disclosure are not limited thereto. When the light emitting layer EL corresponds to the organic light emitting layer, the thin film transistor TFT may apply a voltage (e.g., a set or predetermined voltage) to the first electrode AND of the light emitting element ED, and when the second electrode CAT of the light emitting element ED receives a common voltage or a cathode voltage, holes and electrons may move to the organic light emitting layer EL through a hole transporting layer and an electron transporting layer, and may be combined with each other in the organic light emitting layer EL to emit light.

The second electrode CAT may be located on the light emitting layer EL. For example, the second electrode CAT may be implemented in the form of an electrode that is not distinguished for each of the plurality of pixels and covers the entire pixels in common. For example, the second electrode CAT may be located on the light emitting layer EL in the first to third light emission areas EA1, EA2 and EA3, and may be located on the pixel defining layer PDL in an area excluding the first to third light emission areas EA1, EA2 and EA3.

The pixel defining layer PDL may define the first to third light emission areas EA1, EA2 and EA3. The pixel defining layer PDL may separate and insulate the first electrodes AND of the plurality of light emitting elements ED from each other.

The encapsulation layer TFEL may be located on the second electrode CAT to cover the plurality of light emitting elements ED. The encapsulation layer TFEL may include at least one inorganic layer to prevent oxygen or moisture from being permeated into the light emitting element layer EML. The encapsulation layer TFEL may include at least one organic layer to protect the light emitting element layer EML from particles such as dust.

The touch unit TSU may be located on the encapsulation layer TFEL. The touch unit TSU may include a third buffer layer BF3, a bridge electrode CE, a first insulating layer SIL1, a first electrode TE, a second electrode RE and a second insulating layer SIL2.

The third buffer layer BF3 may be located on the encapsulation layer TFEL. The third buffer layer BF3 may have insulating and optical functions. The third buffer layer BF3 may include at least one inorganic layer. Optionally, the third buffer layer BF3 may be omitted.

The bridge electrode CE may be located on the third buffer layer BF3. The bridge electrode CE may be located on a different layer from the first electrode TE and the second electrode RE to connect the first electrodes TE adjacent to each other in the second direction (e.g., the second direction Y of FIG. 7). For example, the bridge electrode CE may be formed of a single layer of molybdenum (Mo), titanium (Ti), copper (Cu) or aluminum (Al), a stacked structure (Ti/Al/Ti) of aluminum and titanium, a stacked structure (ITO/Al/ITO) of aluminum and ITO, an APC alloy and a stacked structure (ITO/APC/ITO) of an APC alloy and ITO.

The first insulating layer SIL1 may cover the bridge electrode CE and the third buffer layer BF3. The first insulating layer SIL1 may have insulating and optical functions. For example, the first insulating layer SIL1 may be formed of an inorganic layer, for example, a silicon nitride layer, a silicon oxynitride layer, a silicon oxide layer, a titanium oxide layer or an aluminum oxide layer.

The first electrode TE and the second electrode RE may be located on the first insulating layer SIL1. Each of the first electrode TE and the second electrode RE may not overlap the first to third light emission areas EA1, EA2 and EA3. Each of the first electrode TE and the second electrode RE may be formed of a single layer of molybdenum (Mo), titanium (Ti), copper (Cu) and aluminum (Al) or may be formed of a stacked structure (Ti/Al/Ti) of aluminum and titanium, a stacked structure (ITO/Al/ITO) of aluminum and ITO, an APC alloy and a stacked structure (ITO/APC/ITO) of an APC alloy and ITO.

The second insulating layer SIL2 may cover the first electrode TE, the second electrode RE and the first insulating layer SIL1. The second insulating layer SIL2 may have insulating and optical functions. The second insulating layer SIL2 may be formed of a material of the first insulating layer SIL1.

In FIG. 8, the bridge electrode CE is formed below the first electrode TE and the second electrode RE, but embodiments according to the present disclosure are not limited thereto. For example, the bridge electrode CE may be formed on an upper layer of the first electrode TE and the second electrode RE.

Figure 9:
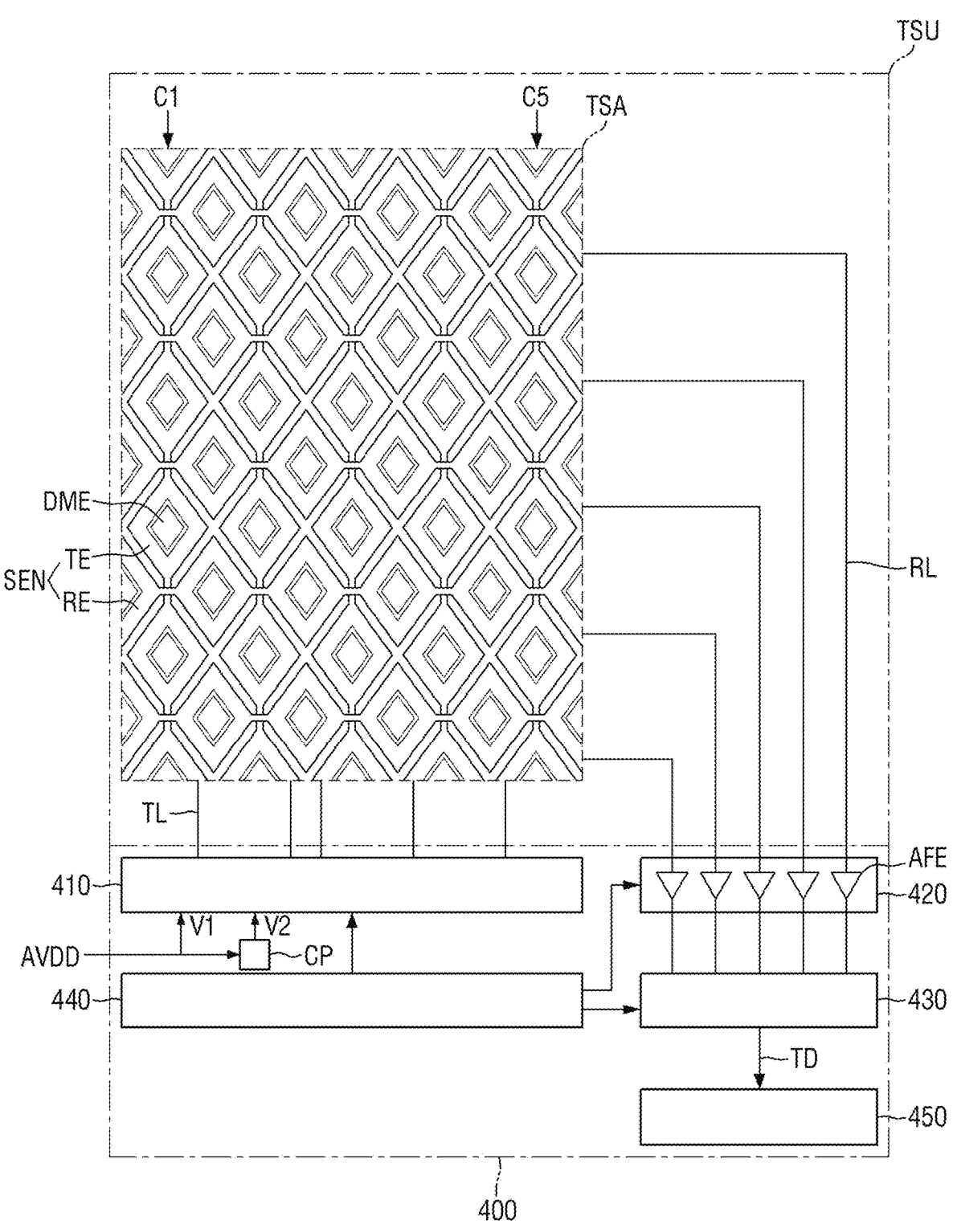
FIG. 9 is a schematic block diagram illustrating elements of a touch unit and a touch driver according to some embodiments.

FIG. 9 is a schematic block diagram illustrating elements of a touch unit and a touch driver according to some embodiments.

Referring to FIG. 9, the display device 10 may include a touch unit TSU and a touch driving circuit 400. The touch unit TSU shown in FIG. 9 is substantially the same as the touch unit TSU described with reference to FIGS. 2 to 8. Therefore, the description of the touch unit TSU of FIG. 9 will be replaced with the description made with reference to FIGS. 2 to 8.

The touch driving circuit 400 includes a driving signal output unit 410, a sensing circuit unit 420, an analog-to-digital converter 430, a touch controller 440 and a touch data compensator 450. In addition, the touch driving circuit 400 may further include a charge pump CP receiving an analog voltage from the outside and boosting the input analog voltage.

The charge pump CP boosts an analog voltage having a first potential to generate a high potential power source having a second potential greater than the first potential. The high potential power source boosted from the charge pump CP is supplied to the driving signal output unit 410.

The driving signal output unit 410 outputs touch driving signals to the first electrodes TE through touch driving lines TL. The touch driving signals may be a plurality of pulse type signals.

The driving signal output unit 410 may output the touch driving signals to touch driving lines TL in an order (e.g., a set or predetermined order). For example, the driving signal output unit 410 may sequentially output the touch driving signals from the first electrodes TE of a first column C1 located on the leftmost side of the touch sensing area TSA to the first electrodes TE of a fifth column C5 located at the rightmost side of the touch sensing area TSA.

The driving signal output unit 410 may output a first touch driving signal having a first potential V1 or output a second touch driving signal having a second potential V2. According to some embodiments, the touch driving circuit 400 may be controlled by the display driving circuit 200. The driving signal output unit 410 of the touch driving circuit 400 may output the first touch driving signal or the second touch driving signal based on the control of the display driving circuit 200. The first touch driving signal may be a pulse type signal including a first potential V1. The second touch driving signal may be a pulse type signal including a second potential V2 greater than the first potential V1.

According to some embodiments, the first potential V1 is substantially equal to the potential of an externally input analog voltage AVDD. The first potential V1 may be about 3V, but embodiments according to the present disclosure are not limited thereto. The second potential V2 is a high potential power source boosted by the charge pump CP and may be about 6V, but embodiments according to the present disclosure are not limited thereto.

The sensing circuit unit 420 may be connected to the second electrodes RE via the sensing lines RL. The sensing circuit unit 420 may sense the amount of a charge change in mutual capacitance of touch nodes corresponding to intersections of the first electrodes TE and the second electrodes RE through the sensing lines RL. The sensing circuit unit 420 may acquire raw data corresponding to the amount of the charge change in mutual capacitance of the touch nodes. The raw data may include, for example, first raw data acquired when the driving signal output unit 410 outputs the first touch driving signal and second raw data acquired when the driving signal output unit 410 outputs the second touch driving signal.

The sensing circuit unit 420 may include operational amplifiers AFE for sensing the amount of the charge change in mutual capacitance of the touch nodes. The operational amplifiers AFE may be connected to the sensing lines RL in one-to-one correspondence. The operational amplifiers AFE may amplify the raw data input in an analog form.

The analog-to-digital converter 430 converts each of output voltages of the operational amplifiers AFE of the sensing circuit unit 420 into touch sensing data TD that are digital data.

The touch controller 440 controls the driving timing of the driving signal output unit 410, the sensing circuit unit 420 and the analog-to-digital converter 430. The touch controller 440 may output a timing signal for synchronizing the driving signal output unit 410, the sensing circuit unit 420 and the analog-to-digital converter 430 to each of the driving signal output unit 410, the sensing circuit unit 420 and the analog-to-digital converter 430.

In addition, the touch controller 440 may control the driving signal output unit 410 to output a first touch driving signal having a first potential or a second touch driving signal having a second potential based on a control signal of the display driving circuit 200.

The touch data compensator 450 receives touch sensing data TD sensed from all touch nodes of the touch sensing area TSA from the analog-to-digital converter 430. The touch data compensator 450 calculates a touch area ratio by analyzing the touch sensing data TD, and compensates for the touch sensing data TD in accordance with the touch area ratio.

According to some embodiments, the touch controller 440 compares the first raw data acquired when outputting the first touch driving signal with the second raw data acquired when outputting the second touch driving signal. The touch controller 440 determines whether the charge pump CP is normal, based on the comparison result.

Hereinafter, a method for inspecting and determining whether the charge pump CP is normal, through the touch controller 440 according to some embodiments will be described in detail with reference to FIGS. 10 to 12.

Figure 10:
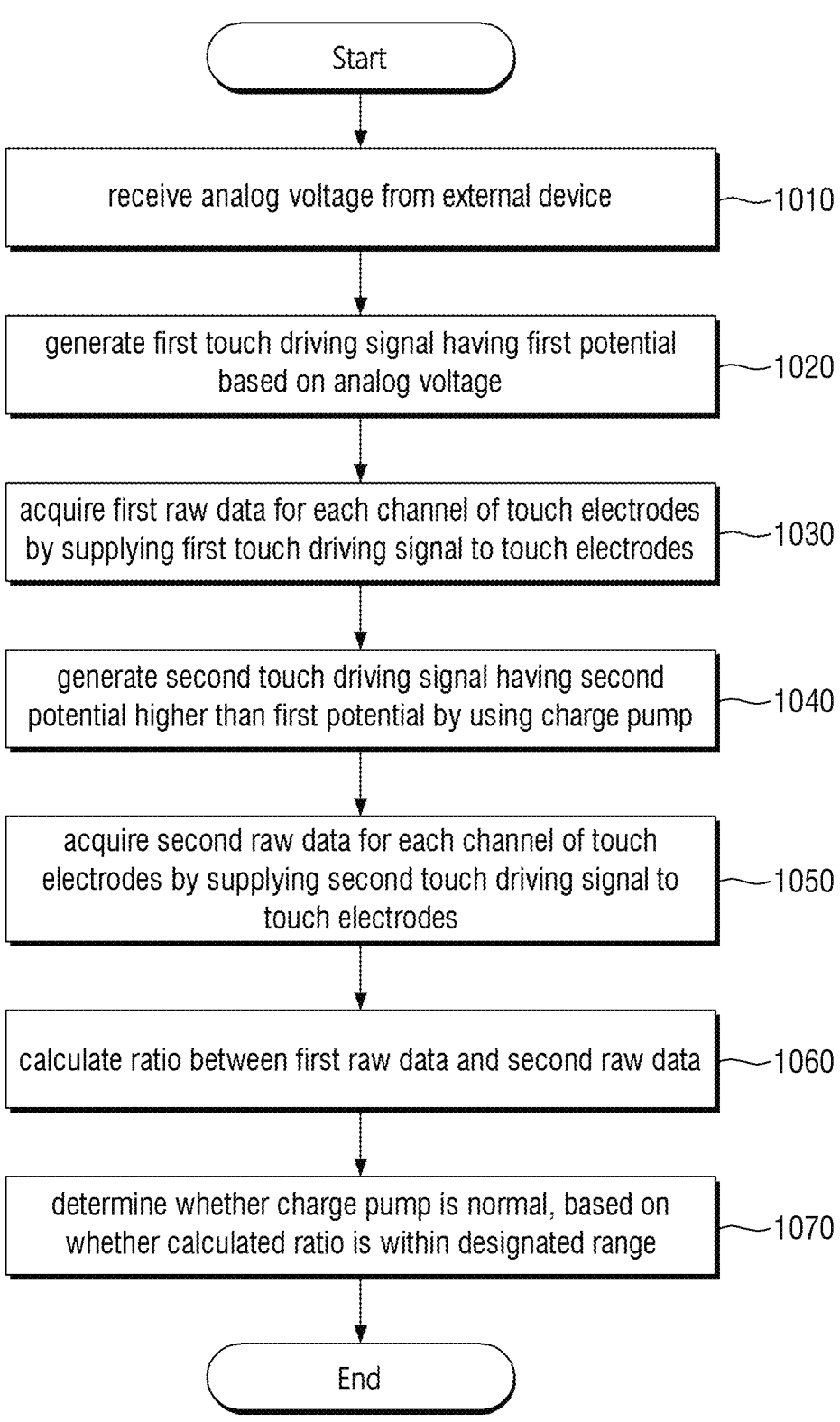
FIG. 10 is a flow chart illustrating an inspecting method of a display device according to some embodiments.

FIG. 10 is a flow chart illustrating an inspecting method of a display device according to some embodiments.

Operations shown in FIG. 10 may be performed by the touch controller 440 or the display driving circuit 200 (e.g., DDI) of the display device 10. For example, the touch controller 440 may perform the operations for inspecting whether the charge pump CP is normal, based on execution of an instruction or an application program, which is stored in a memory of the display device 10.

At least some of the operations shown in FIG. 10 may be omitted. At least some of the operations mentioned with reference to other drawings of the present disclosure may be additionally inserted before or after each operation shown in FIG. 10. Hereinafter, an inspecting method of the display device 10 according to some embodiments will be described in more detail with reference to FIG. 10.

In operation 1010, the touch controller 440 may receive an analog voltage AVDD from an external device. The external device may be, for example, a battery included in a mobile electronic device to which the display device 10 according to some embodiments is applied. Alternatively, the external device may be a charger (e.g., travel adapter) connected to the mobile electronic device by wire. The analog voltage AVDD may have a potential of about 3V. The touch controller 440 may control the charge pump CP to receive the analog voltage AVDD from the external device.

In operation 1020, the touch controller 440 generates a first touch driving signal having a first potential V1 based on the analog voltage AVDD. The touch controller controls the driving signal output unit 410 to generate the first touch driving signal based on the analog voltage AVDD having a first potential V1. The driving signal output unit 410 may generate a first touch driving signal of a pulse type, which has a first potential V1.

In operation 1030, the touch controller 440 acquires first raw data for each channel of the touch electrodes by supplying the first touch driving signal to the touch electrodes. The touch controller 440 controls the driving signal output unit 410 to output the first touch driving signal. The driving signal output unit 410 outputs first touch driving signals to the first electrodes TE through the touch driving lines TL. The touch controller 440 controls the sensing circuit unit 420 to sense the amount of the charge change in mutual capacitance of the touch nodes corresponding to the intersections of the first electrodes TE and the second electrodes RE through the sensing lines RL. The touch controller 440 amplifies the first raw data sensed through the sensing circuit unit 420 by using the operational amplifier AFE and converts the first raw data into digital data by using the analog-to-digital converter 430.

In operation 1040, the touch controller 440 generates a second touch driving signal having a second potential V2 higher than the first potential V1 by using the charge pump CP. The touch controller 440 controls the charge pump CP to generate a high potential power source having a second potential V2 by boosting the analog voltage AVDD. The touch controller 440 controls the charge pump CP to supply the boosted high potential power source to the driving signal output unit 410. The touch controller 440 controls the driving signal output unit 410 to generate a second touch driving signal of a pulse type, which has a second potential V2, by using the high potential power source.

In operation 1050, the touch controller 440 acquires second raw data for each channel of the touch electrodes by supplying the second touch driving signal to the touch electrodes. The touch controller 440 controls the driving signal output unit 410 to output the second touch driving signal. The driving signal output unit 410 outputs the second touch driving signals to the first electrodes TE through the touch driving lines TL. The touch controller 440 controls the sensing circuit unit 420 to sense the amount of the charge change in mutual capacitance of the touch nodes corresponding to the intersections of the first electrodes TE and the second electrodes RE through the sensing lines RL. The touch controller 440 amplifies the second raw data sensed through the sensing circuit unit 420 by using the operational amplifier AFE and converts the second raw data into digital data by using the analog-to-digital converter 430.

In operation 1060, the touch controller 440 calculates a ratio between the first raw data and the second raw data. For example, Table 1 is an example of the first raw data converted into the digital data. The data included in Table 1 may be digital data corresponding to a change in capacitance sensed for each channel of the touch electrodes SEN when a first touch driving signal having a first potential V1 is applied. For example, Table 2 is an example of the second raw data converted into the digital data. The data included in Table 2 may be digital data corresponding to a change in capacitance sensed for each channel of the touch electrodes SEN when a second touch driving signal having a first potential V1 is applied.

TABLE 1

|     | TX0 | TX1 | TX2 | TX3 | TX4 |
|-----|-----|-----|-----|-----|-----|
| RX0 | 303 | 366 | 362 | 366 | 370 |
| RX1 | 303 | 312 | 315 | 318 | 321 |
| RX2 | 298 | 309 | 312 | 316 | 318 |
| RX3 | 299 | 309 | 312 | 316 | 318 |
| RX4 | 303 | 314 | 318 | 321 | 323 |

TABLE 2

|     | TX0 | TX1 | TX2 | TX3 | TX4 |
|-----|-----|-----|-----|-----|-----|
| RX0 | 688 | 835 | 827 | 836 | 844 |
| RX1 | 687 | 715 | 721 | 727 | 732 |
| RX2 | 677 | 707 | 714 | 721 | 727 |
| RX3 | 678 | 708 | 715 | 722 | 728 |
| RX4 | 689 | 717 | 726 | 734 | 739 |

The touch controller 440 may calculate a ratio between the first raw data and the second raw data for each channel of the touch electrodes SEN. Embodiments of the present disclosure are not limited to that the touch controller 440 compares the first raw data with the second raw data for each channel. For example, the touch controller 440 may determine a first representative value from the plurality of first raw data, determine a second representative value from the plurality of second data and compare the determined first representative value with the determined second representative value. A method for determining a first representative value and a second representative value by a touch controller 440 will be described in detail with reference to FIGS. 11 and 12.

In operation 1070, the touch controller 440 determines whether the charge pump CP is normal, based on whether the calculated ratio is in a designated range. For example, when the charge pump CP has boosted the analog voltage AVDD normally, the first raw data and the second raw data generally have a designated ratio within a range (e.g., a set or predetermined range). On the other hand, when the charge pump CP is in an abnormal state that does not boost the analog voltage AVDD, the first raw data and the second raw data may deviate from the range of the designated ratio. The touch controller 440 determines that the charge pump CP is in an abnormal state when the calculated ratio deviates from the designated range. The touch controller 440 determines that the charge pump CP is in a normal state when the calculated ratio is within the designated range.

FIG. 11 is a flow chart illustrating an inspecting method of a defect in a charge pump CP according to some embodiments by using an average.

The operations shown in FIG. 11 may be performed by the touch controller 440 or the display driver circuit 200 (e.g., DDI) of the display device 10. For example, the touch controller 440 may perform operations for inspecting whether the charge pump CP is normal, based on execution of an instruction or an application program, which is stored in a memory of the display device 10.

At least some of the operations shown in FIG. 11 may be omitted. At least some of the operations mentioned with reference to other drawings of the present disclosure may be additionally inserted before or after each operation shown in FIG. 11. Hereinafter, the inspecting method of a defect in the charge pump CP according to some embodiments by using an average will be described with reference to FIG. 11.

In operation 1110, the touch controller 440 calculates an average of the first raw data and defines the calculated average as a first sensing value (or a first representative value). The touch controller 440 may calculate the average of the first raw data acquired for each channel. For example, the touch controller 440 may determine the average value of the first raw data listed in Table 1 as the first sensing value.

In operation 1120, the touch controller 440 calculates an average of the second raw data and defines the calculated average as a second sensing value (or a second representative value). The touch controller 440 may calculate the average of the second raw data acquired for each channel. For example, the touch controller 440 may determine the average value of the second raw data listed in Table 2 as the second sensing value.

In operation 1130, the touch controller 440 calculates a ratio between the first sensing value and the second sensing value.

In operation 1140, the touch controller 440 determines whether the charge pump CP is normal, based on whether the calculated ratio is in a designated range. The touch controller 440 determines that the charge pump CP is in an abnormal state when the calculated ratio deviates from the designated range. The touch controller 440 determines that the charge pump CP is in a normal state when the calculated ratio is within the designated range.

Figure 12:
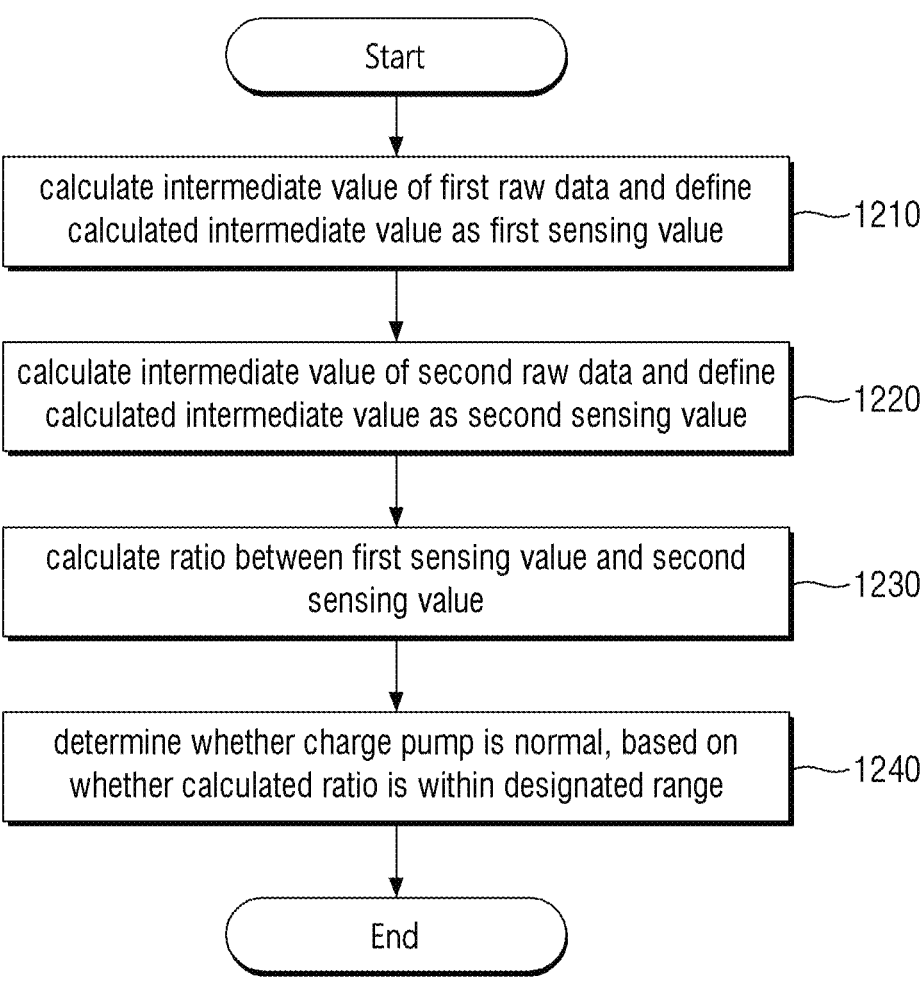
FIG. 12 is a flow chart illustrating an inspecting method of a defect in a charge pump according to some embodiments by using an intermediate value.

FIG. 12 is a flow chart illustrating an inspecting method of a defect in a charge pump CP according to some embodiments by using an intermediate value.

The operations shown in FIG. 12 may be performed by the touch controller 440 or the display driving circuit 200 (e.g., DDI) of the display device. For example, the touch controller 440 may perform operations for inspecting whether the charge pump CP is normal, based on execution of an instruction or application program, which is stored in a memory of the display device 12.

At least some of the operations shown in FIG. 12 may be omitted. At least some of the operations mentioned with reference to other drawings of the present disclosure may be additionally inserted before or after each operation shown in FIG. 12. Hereinafter, the inspecting method of a defect in the charge pump CP according to some embodiments by using an intermediate value will be described with reference to FIG. 11.

In operation 1210, the touch controller 440 calculates an intermediate value of the first raw data and defines the calculated intermediate value as a first sensing value (or a first representative value). The touch controller 440 may calculate the intermediate value of the first raw data acquired for each channel. For example, the touch controller 440 may determine the intermediate value of the first raw data listed in Table 1 as the first sensing value.

In operation 1220, the touch controller 440 calculates an intermediate value of the second raw data and defines the calculated intermediate value as a second sensing value (or a second representative value). The touch controller 440 may calculate the intermediate value of the second raw data acquired for each channel. For example, the touch controller 440 may determine the intermediate value of the second raw data listed in Table 2 as the second sensing value.

In operation 1230, the touch controller 440 calculates a ratio between the first sensing value and the second sensing value.

In operation 1240, the touch controller 440 determines whether the charge pump CP is normal, based on whether the calculated ratio is in a designated range. The touch controller 440 determines that the charge pump CP is in an abnormal state when the calculated ratio deviates from the designated range. The touch controller 440 determines that the charge pump CP is in a normal state when the calculated ratio is within the designated range.

According to various embodiments, embodiments according to the present disclosure are not limited to that the touch unit TSU is a mutual capacitance type. For example, as shown in FIG. 13, the touch unit TSU of the present disclosure may sense a touch input of a user in a self-capacitance manner.

Figure 13:
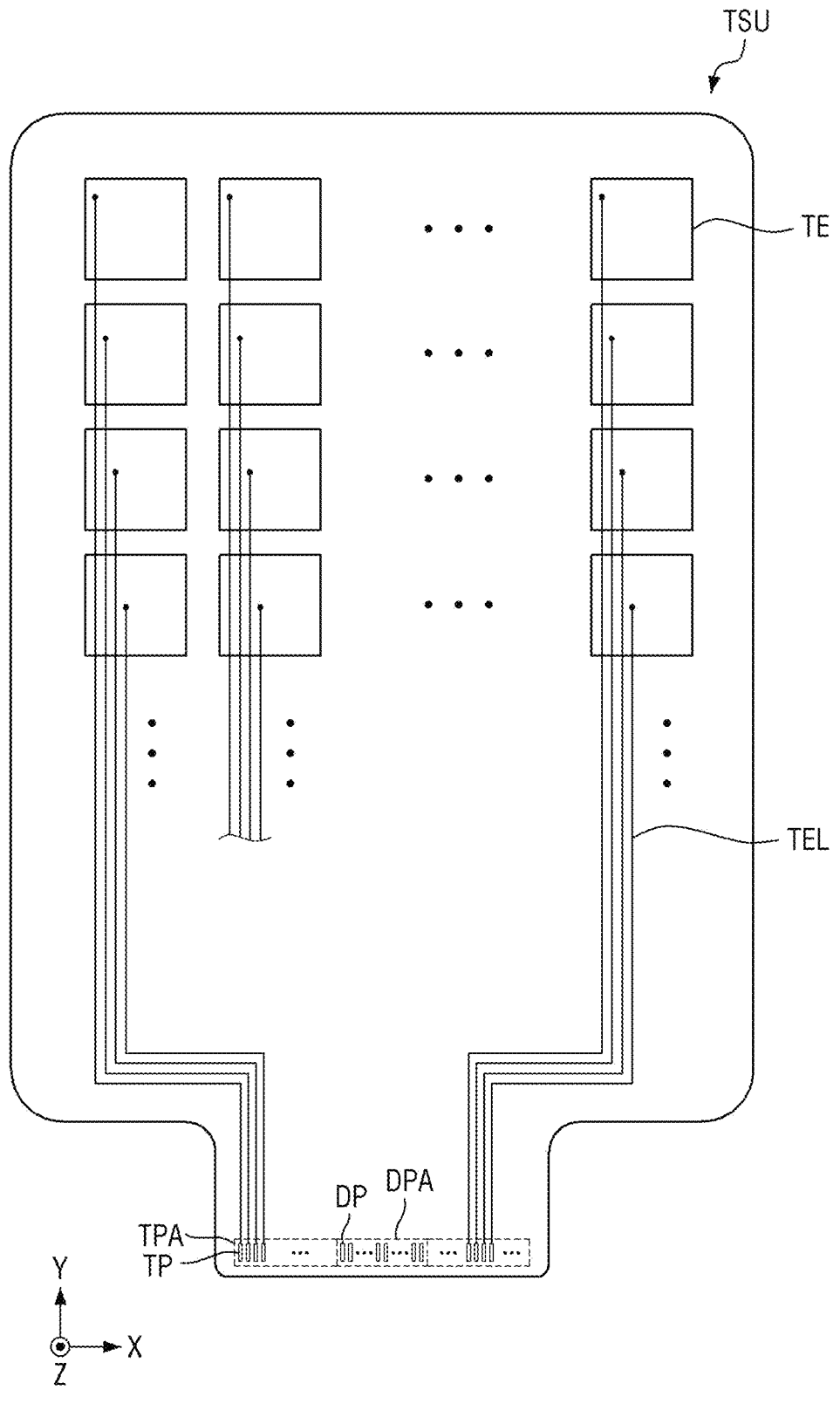
FIG. 13 is a schematic plan view illustrating a touch unit of a self-capacitance manner according to some embodiments.

FIG. 13 is a schematic plan view illustrating a touch unit of a self-capacitance manner.

Referring to FIG. 13, the touch unit TSU according to some embodiments may include a plurality of self-touch electrodes TE, and the plurality of self-touch electrodes TE may be arranged to overlap the plurality of pixels P of the display panel 100. For example, because the plurality of self-touch electrodes TE are arranged in the form of a matrix, a user touch generated on the surface of the display device 10 may be sensed. For example, a size of the self-touch electrode TE may be set in consideration of a contact area of a finger, a contact area of a pen, etc.

Each of the plurality of self-touch electrodes TE may be connected to the touch driving circuit 400 through each of a plurality of touch electrode lines TEL. In detail, one end of each of the plurality of touch electrode lines TEL may be connected to each self-touch electrode TE, and the other end of each of the plurality of touch electrode lines TEL may be connected to the touch pad TP located in the touch peripheral area TPA.

Each of the plurality of self-touch electrodes TE may be supplied with a touch driving signal. Each of the plurality of self-touch electrodes TE may form a capacitance (e.g., a set or predetermined capacitance) with an electrode, a driving line or signal lines of the display unit DU. At this time, when a user touch is generated on the plurality of self-touch electrodes TE, additional capacitance is generated between the plurality of self-touch electrodes TE and the user, so that the capacitance of the plurality of self-touch electrodes TE may be changed. The touch driving circuit 400 senses a change in capacitance formed in each of the plurality of self-touch electrodes TE, thereby sensing whether a user touch occurs or not and a touch position.

According to some embodiments, the touch driving circuit 400 may acquire the first raw data and the second raw data by performing the operations as described with reference to FIGS. 10 to 12, as data corresponding to the change in capacitance formed in each of the plurality of self-touch electrodes TE. The touch driving circuit 400 may determine whether the charge pump CP is normal, based on the result of calculating the ratio between the first raw data and the second raw data.

In the display device and the inspecting method thereof according to some embodiments, it may be possible to relatively easily inspect whether the charge pump embedded in the touch driving circuit is normal.

In concluding the detailed description, those skilled in the art will appreciate that many variations and modifications can be made to the disclosed embodiments without substantially departing from the principles of embodiments according to the present invention. Therefore, the disclosed embodiments of the invention are used in a generic and descriptive sense only and not for purposes of limitation, and embodiments according to the present disclosure are defined by the appended claims, and their equivalents.

What is claimed is:

1. An inspecting method of a display device, the method comprising:
    receiving an analog voltage from an external device;
    generating a first touch driving signal having a first potential based on the analog voltage;
    acquiring first raw data for each channel of touch electrodes corresponding to a first capacitance change of the touch electrodes by supplying the first touch driving signal to the touch electrodes;
    generating a second touch driving signal having a second potential higher than the first potential by using a charge pump;
    acquiring second raw data for each channel of the touch electrodes corresponding to a second capacitance change of the touch electrodes by supplying the second touch driving signal to the touch electrodes;
    calculating a ratio between the first raw data and the second raw data; and
    determining the charge pump is normal, based on the calculated ratio being within a designated range.

2. The inspecting method of claim 1, further comprising:
    calculating an average of the first raw data and defining the calculated average as a first sensing value;
    calculating an average of the second raw data and defining the calculated average as a second sensing value;
    calculating a ratio between the first sensing value and the second sensing value; and determining the charge pump is normal, based on the calculated ratio being within a designated range.

3. The inspecting method of claim 1, further comprising:
    calculating an intermediate value of the first raw data and defining the calculated intermediate value as a first sensing value;
    calculating an intermediate value of the second raw data and defining the calculated intermediate value as a second sensing value;
    calculating a ratio between the first sensing value and the second sensing value; and
    determining the charge pump is normal, based on the calculated ratio being within a designated range.

4. The inspecting method of claim 1, wherein the touch electrodes include a plurality of first electrodes and a plurality of second electrodes intersecting the plurality of first electrodes.

5. The inspecting method of claim 4, wherein the first and second touch driving signals are signals applied to the plurality of first electrodes.

6. The inspecting method of claim 4, wherein the first raw data and the second raw data include analog data read out through the plurality of second electrodes.

7. The inspecting method of claim 6, further comprising:
    converting the first raw data from an analog signal into a digital signal; and
    converting the second raw data from an analog signal into a digital signal.

8. The inspecting method of claim 1, wherein the touch electrodes include a plurality of self-touch electrodes arranged in the form of a matrix.

9. The inspecting method of claim 1, wherein the charge pump is embedded in a touch driving circuit of the display device.

10. The inspecting method of claim 1, wherein the first potential is 3 volts (V), and the second potential is 6V.

11. A display device comprising:
    a touch unit including touch electrodes; and
    a touch driving circuit,
    wherein the touch driving circuit includes:
    a driving signal output unit configured to output a touch driving signal;
    a charge pump configured to boost an analog voltage having a first potential to a high potential power source having a second potential;
    a sensing circuit unit configured to sense raw data corresponding to a change in capacitance of the touch electrodes;
    an analog-to-digital converter configured to convert the raw data acquired by the sensing circuit unit into digital data; and
    a touch controller,
    wherein the touch controller is configured to:
    control the driving signal output unit to output a first touch driving signal having the first potential,
    control the sensing circuit unit to acquire first raw data based on an output of the first touch driving signal,
    control the driving signal output unit to output a second touch driving signal having the second potential,
    control the sensing circuit unit to acquire second raw data based on an output of the second touch driving signal,
    calculate a ratio between the first raw data and the second raw data, and
    determine the charge pump is normal, based on the calculated ratio being in a designated range.

12. The display device of claim 11, wherein the touch controller is further configured to:

calculate an average of the first raw data and define the calculated average as a first sensing value, calculate an average of the second raw data and define the calculated average as a second sensing value, calculate a ratio between the first sensing value and the second sensing value, and determine the charge pump is normal, based on the calculated ratio being within a designated range.

13. The display device of claim 11, wherein the touch controller is further configured to:

calculate an intermediate value of the first raw data and define the calculated intermediate value as a first sensing value, calculate an intermediate value of the second raw data and define the calculated intermediate value as a second sensing value, calculate a ratio between the first sensing value and the second sensing value, and determine the charge pump is normal, based on the calculated ratio being within a designated range.

14. The display device of claim 11, wherein the touch electrodes include a plurality of first electrodes and a plurality of second electrodes intersecting the plurality of first electrodes.

15. The display device of claim 14, wherein the first and second touch driving signals are signals configured to be applied to the plurality of first electrodes.

16. The display device of claim 14, wherein the first raw data and the second raw data include analog data read out through the plurality of second electrodes.

17. The display device of claim 16, wherein the touch controller is configured to control the analog-to-digital converter to convert the first raw data from an analog signal into a digital signal, and to control the analog-to-digital converter to convert the second raw data from an analog signal into a digital signal.

18. The display device of claim 11, wherein the touch electrodes include a plurality of self-touch electrodes arranged in the form of a matrix.

19. The display device of claim 11, wherein the analog voltage is input from a battery.

20. The display device of claim 11, wherein the first potential is 3 volts (V), and the second potential is 6V.

* * * * *